United States Patent
Oba et al.

(10) Patent No.: US 11,528,413 B2
(45) Date of Patent: Dec. 13, 2022

(54) IMAGE PROCESSING APPARATUS AND IMAGE PROCESSING METHOD TO GENERATE AND DISPLAY AN IMAGE BASED ON A VEHICLE MOVEMENT

(71) Applicant: SONY CORPORATION, Tokyo (JP)

(72) Inventors: Eiji Oba, Tokyo (JP); Tomonori Agawa, Kanagawa (JP); Kyohei Yoshimura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/323,030

(22) PCT Filed: Jul. 21, 2017

(86) PCT No.: PCT/JP2017/026413
§ 371 (c)(1),
(2) Date: Feb. 4, 2019

(87) PCT Pub. No.: WO2018/037789
PCT Pub. Date: Mar. 1, 2018

(65) Prior Publication Data
US 2019/0174060 A1 Jun. 6, 2019

(30) Foreign Application Priority Data
Aug. 22, 2016 (JP) .............................. JP2016-161826

(51) Int. Cl.
*H04N 5/232* (2006.01)
*B60R 1/00* (2006.01)
(Continued)

(52) U.S. Cl.
CPC ......... *H04N 5/23238* (2013.01); *B60Q 9/008* (2013.01); *B60R 1/00* (2013.01);
(Continued)

(58) Field of Classification Search
CPC .. H04N 5/23238; B60Q 9/008; G06T 3/4038; B60R 2300/105; B60R 2300/304;
(Continued)

(56) References Cited

U.S. PATENT DOCUMENTS 7,366,595 B1   4/2008  Shimizu et al.
9,219,887 B2 * 12/2015  Iga ........................... B60R 1/00
(Continued)

FOREIGN PATENT DOCUMENTS

CN    101311672 A    11/2008
CN    101676149 A     3/2010
(Continued)

OTHER PUBLICATIONS

Yi-Yuan Chen, Yuan-Yao Tu, Cheng-Hsiang Chiu and Y. Chen, "An embedded system for vehicle surrounding monitoring," 2009 2nd International Conference on Power Electronics and Intelligent Transportation System (PEITS), Shenzhen, China, 2009, pp. 92-95, doi: 10.1109/PEITS.2009.5406797. (Year: 2009).*
(Continued)

*Primary Examiner* — Michael Robert Cammarata
(74) *Attorney, Agent, or Firm* — Chip Law Group

(57) ABSTRACT

An image processing apparatus is provided. An image photographed by a camera that photographs the surroundings of the vehicle is received. An overhead image, a vehicle travel direction image, and a vehicle lateral side image corresponding to a vehicle movement direction which is either left or right of the vehicle is generated based on the image. The generated image is displayed on a display unit. For example, a display image is generated or updated in accordance with a travel direction of the vehicle and direction-of-rotation information of a steering wheel. In a case where the vehicle is backed counter-clockwise, the overhead image, the vehicle rear image, and a vehicle left side image
(Continued)

are generated and displayed. In a case where the vehicle is backed clockwise, the overhead image, the vehicle rear image, and a vehicle right side image are generated and displayed.

19 Claims, 26 Drawing Sheets

(51) Int. Cl.
    *G06T 3/40* (2006.01)
    *B60Q 9/00* (2006.01)
    *H04N 7/18* (2006.01)
    *H04N 5/357* (2011.01)
    *H04N 5/247* (2006.01)

(52) U.S. Cl.
    CPC ........... *G06T 3/4038* (2013.01); *H04N 5/247* (2013.01); *H04N 5/3572* (2013.01); *H04N 7/18* (2013.01); *B60R 2300/105* (2013.01); *B60R 2300/304* (2013.01); *B60R 2300/607* (2013.01); *B60R 2300/70* (2013.01); *B60R 2300/806* (2013.01)

(58) Field of Classification Search
    CPC .......... B60R 2300/607; B60R 2300/70; B60R 1/002; B60R 1/006; B60R 1/007; B60R 2001/1253; B60W 30/095; G08G 1/16; G08G 1/165
    See application file for complete search history.

(56) References Cited

U.S. PATENT DOCUMENTS

| | | | | |
|---|---|---|---|---|
| 9,569,967 | B2* | 2/2017 | Petridis | B60W 30/06 |
| 10,692,372 | B2* | 6/2020 | Nilsson | G08G 1/168 |
| 2003/0137586 | A1* | 7/2003 | Lewellen | H04N 7/181 |
| | | | | 348/148 |
| 2006/0061008 | A1* | 3/2006 | Karner | G09G 3/001 |
| | | | | 264/250 |
| 2006/0164230 | A1* | 7/2006 | DeWind | B60K 35/00 |
| | | | | 340/461 |
| 2006/0202984 | A1* | 9/2006 | Yang | G06T 5/006 |
| | | | | 345/419 |
| 2006/0287825 | A1 | 12/2006 | Shimizu et al. | |
| 2006/0287826 | A1* | 12/2006 | Shimizu | B60Q 1/0023 |
| | | | | 701/431 |
| 2007/0008091 | A1* | 1/2007 | Takenaga | B62D 15/0295 |
| | | | | 340/435 |
| 2011/0210868 | A1* | 9/2011 | Yano | B62D 15/027 |
| | | | | 340/932.2 |
| 2012/0296523 | A1* | 11/2012 | Ikeda | B62D 15/0275 |
| | | | | 701/41 |
| 2012/0330541 | A1* | 12/2012 | Sakugawa | G08G 1/166 |
| | | | | 701/301 |
| 2013/0120578 | A1* | 5/2013 | Iga | B60R 1/00 |
| | | | | 348/148 |
| 2014/0152774 | A1* | 6/2014 | Wakabayashi | G06T 3/005 |
| | | | | 348/46 |
| 2014/0152827 | A1* | 6/2014 | Yamamoto | G06T 3/4038 |
| | | | | 348/148 |
| 2014/0285666 | A1* | 9/2014 | O'Connell | B60R 1/12 |
| | | | | 348/148 |
| 2014/0313335 | A1* | 10/2014 | Koravadi | H04N 5/23216 |
| | | | | 348/148 |
| 2014/0333770 | A1* | 11/2014 | Baur | B60R 1/12 |
| | | | | 348/148 |
| 2014/0354816 | A1* | 12/2014 | Inanobe | B60R 1/002 |
| | | | | 348/148 |
| 2015/0073664 | A1* | 3/2015 | Petridis | B60W 30/06 |
| | | | | 701/41 |
| 2015/0116495 | A1* | 4/2015 | Kowatari | B60P 1/04 |
| | | | | 348/148 |
| 2015/0161892 | A1* | 6/2015 | Oremus | B60W 30/08 |
| | | | | 340/901 |
| 2016/0200252 | A1* | 7/2016 | Oota | G08G 1/166 |
| | | | | 701/50 |
| 2016/0305094 | A1* | 10/2016 | Chang | E02F 9/264 |
| 2016/0368417 | A1* | 12/2016 | Bassi | H04N 5/23293 |
| 2017/0343799 | A1* | 11/2017 | Ito | G02B 27/0093 |
| 2017/0374287 | A1* | 12/2017 | Lang | G06K 9/00791 |
| 2018/0056871 | A1* | 3/2018 | Karner | G06T 7/13 |
| 2018/0322655 | A1* | 11/2018 | Nagai | G06T 7/74 |
| 2018/0361933 | A1* | 12/2018 | Ohta | B60R 1/00 |
| 2019/0118860 | A1* | 4/2019 | Gali | B60Q 9/00 |

FOREIGN PATENT DOCUMENTS

| | | |
|---|---|---|
| CN | 102416906 A | 4/2012 |
| CN | 102685382 A | 9/2012 |
| CN | 104442813 A | 3/2015 |
| CN | 105793496 A | 7/2016 |
| EP | 1065642 A2 | 1/2001 |
| EP | 1400410 A2 | 3/2004 |
| EP | 1870870 A1 | 12/2007 |
| EP | 2168815 A1 | 3/2010 |
| EP | 2620330 A1 | 7/2013 |
| JP | 2001-006097 A | 1/2001 |
| JP | 2002-109697 A | 4/2002 |
| JP | 2005-339313 A | 12/2005 |
| JP | 2006-165946 A | 6/2006 |
| JP | 2007-019804 A | 1/2007 |
| JP | 2007-124097 A | 5/2007 |
| JP | 2012-066616 A | 4/2012 |
| JP | 2012-124610 A | 6/2012 |
| JP | 2012-166689 A | 9/2012 |
| JP | 5696679 B2 | 4/2015 |
| JP | 2015-119225 A | 6/2015 |
| WO | 2012/039256 A1 | 3/2012 |

OTHER PUBLICATIONS

Y. Kuroki, et al., "Multimodal Cruising Assist to Enhance the Drivers' Abilities to Perceive Surrounding Contexts Using Panoramic Presentation with Dynamic Multiple Windows," 5th Annual IEEE International Conference (PerComW07), White Plains, NY, USA, 2007, pp. 429-434, doi: 10.1109/PERCOMW.2007.83. (Year: 2007).*

International Search Report and Written Opinion of PCT Application No. PCT/JP2017/026413, dated Oct. 17, 2017, 11 pages of ISRWO.

Office Action for CN Patent Application No. 201780050402.4, dated Feb. 10, 2021, 10 pages of Office Action and 20 pages of English Translation.

Office Action for CN Patent Application No. 201780050402.4, dated Aug. 9, 2021, 11 pages of Office Action and 17 pages of English Translation.

Office Action for CN Patent Application No. 201780050402.4 dated Jan. 13, 2022, 02 pages of English Translation and 01 pages of Office Action.

Miao, et al., "Real Time Mapping Method for Traffic Accident Scene Based on Image Guide", Journal of Shanghai Jiao Tong University, vol. 7, No. 2, Feb. 16, 2013, 6 pages.

* cited by examiner

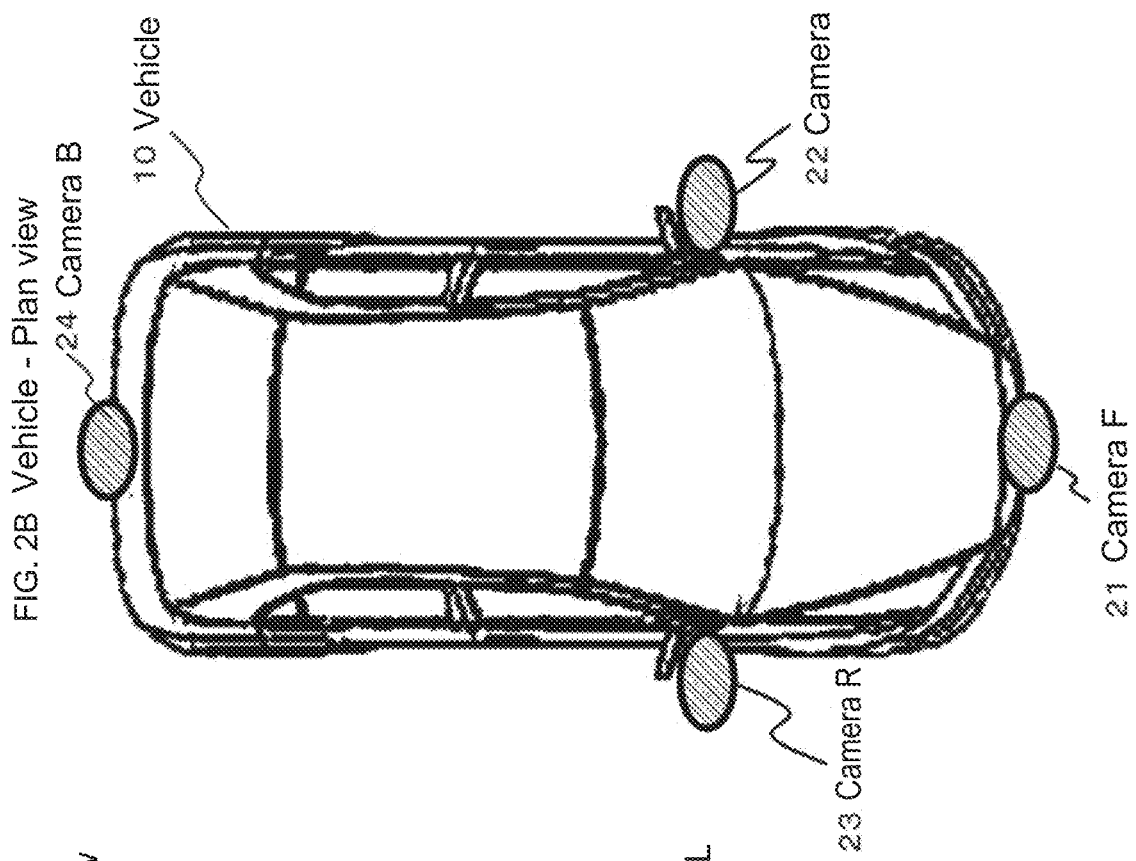
FIG. 2B Vehicle - Plan view
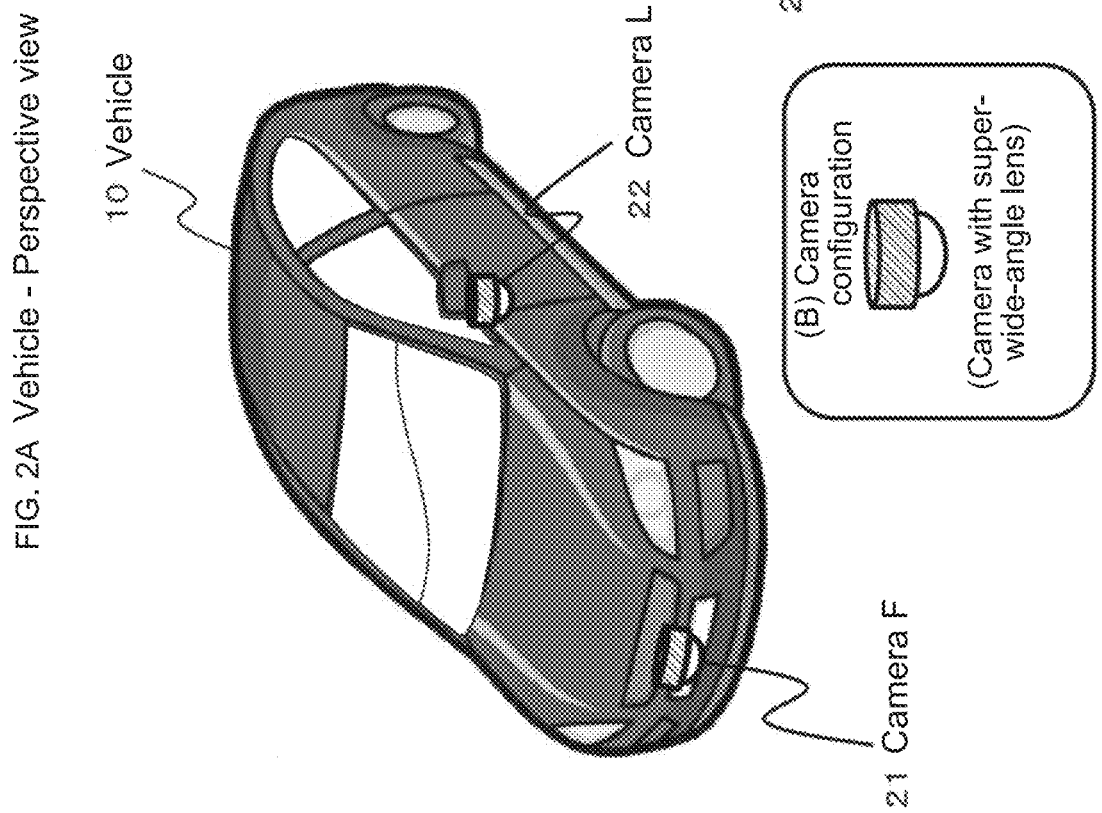
FIG. 2A Vehicle - Perspective view

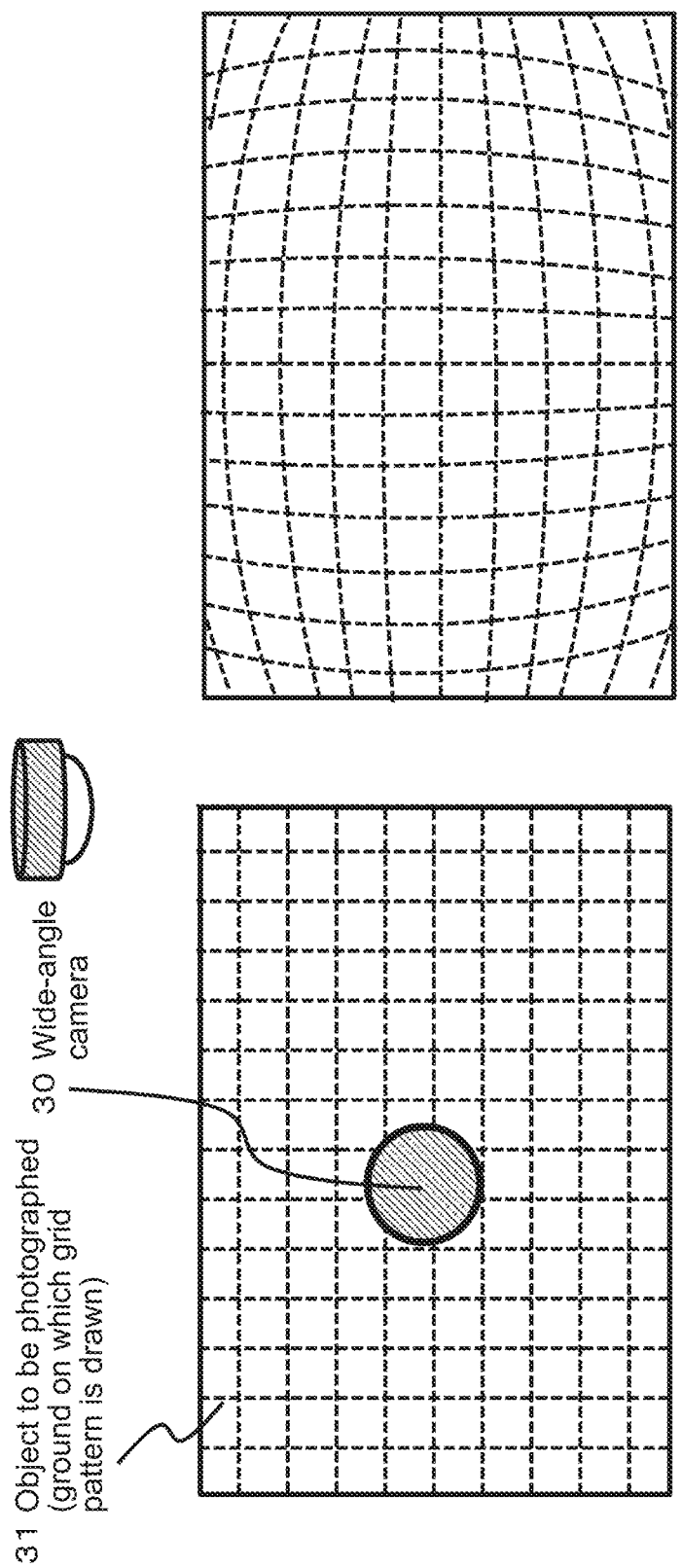

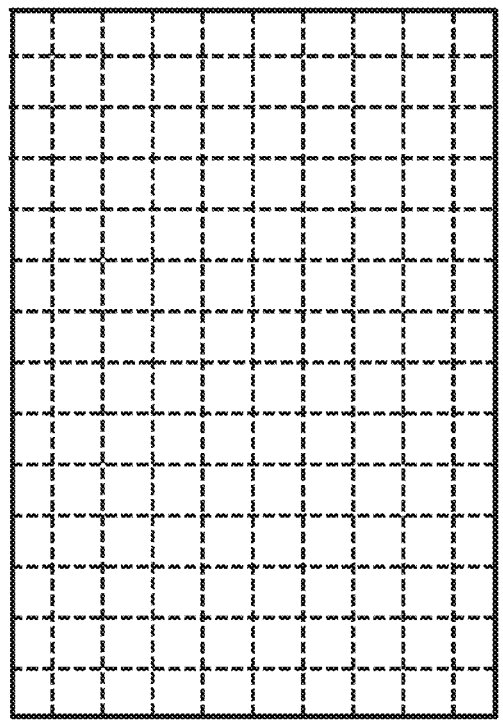
FIG. 4B Corrected image (overhead image)
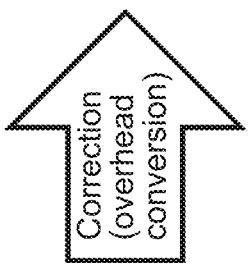
Correction (overhead conversion)
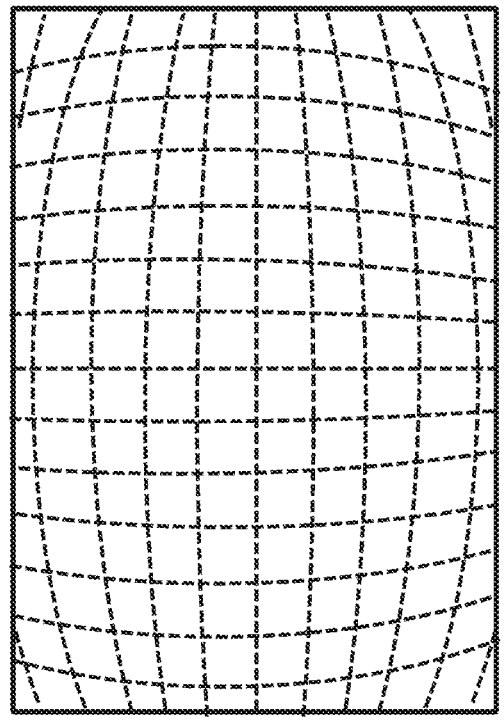
FIG. 4A Photographed image

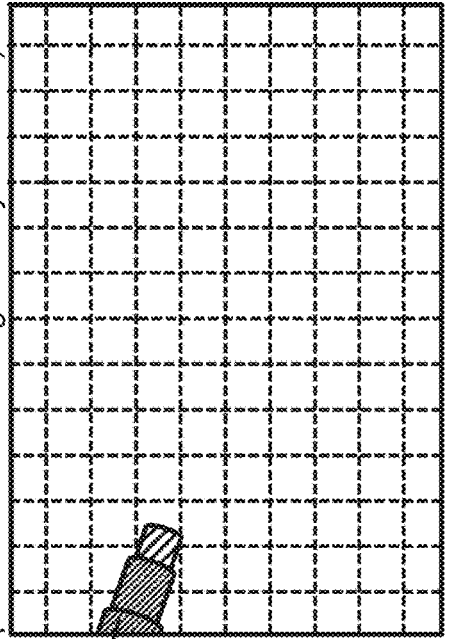

FIG. 5B Corrected image (overhead image converted and virtually generated from proximity position from wide-angle fisheye camera)

Standing object 35

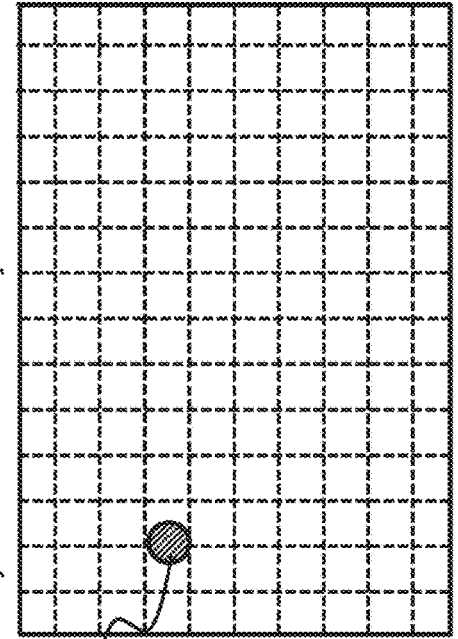

FIG. 5D Example of image photographed by wide-angle fisheye camera from remote position spaced away from road surface by certain distance 35 Standing object

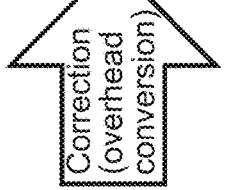

Correction (overhead conversion)

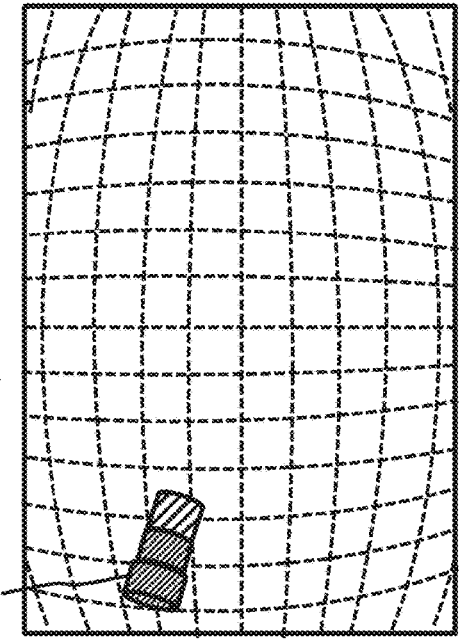

FIG. 5A Photographed image
Standing object
35

FIG. 5C Photographing processing example of capturing standing object on road surface in outer peripheral region having center at optical axis by wide-angle fisheye camera from proximity position of road surface

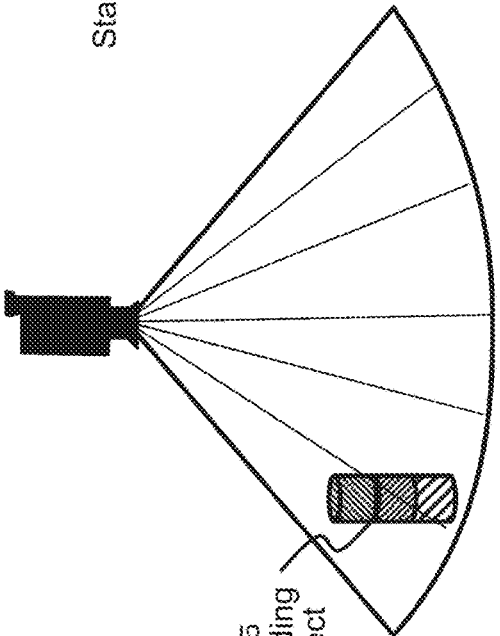

35 Standing object

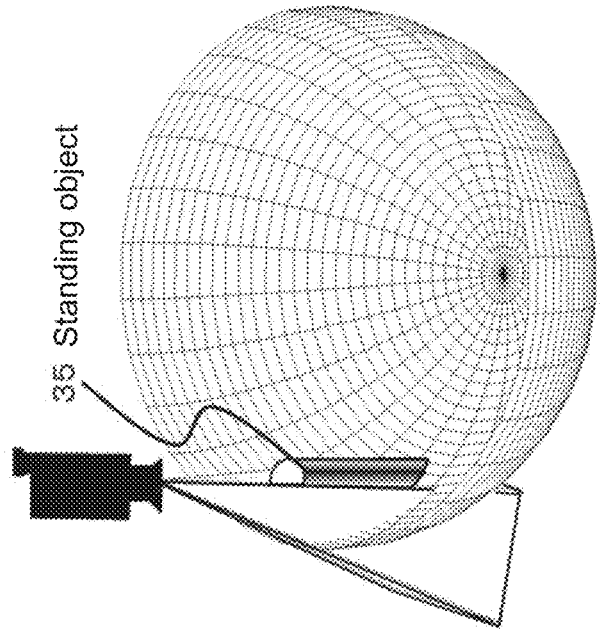

Example of image photographed by wide-angle fisheye camera from remote position spaced away from road surface by certain distance 35 Standing object

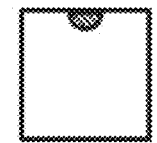

FIG.6B

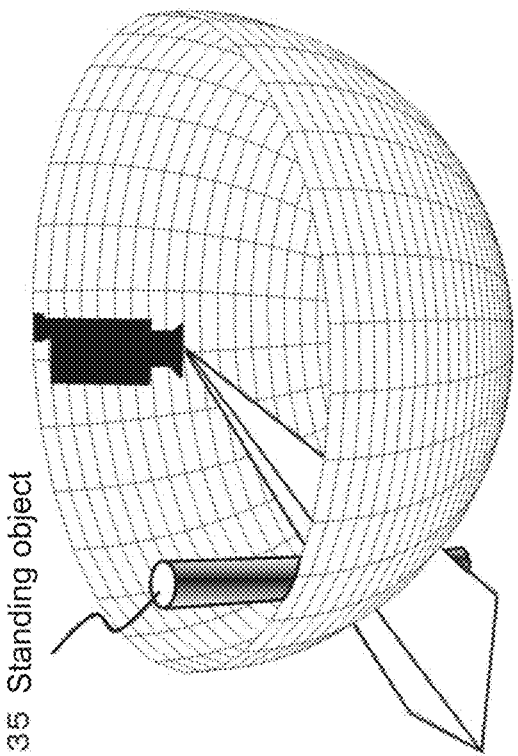

Example of overhead conversion image with respect to photographing processing image of capturing standing object on road surface in outer peripheral region having center at optical axis by wide-angle fisheye camera from proximity position of road surface 35 Standing object

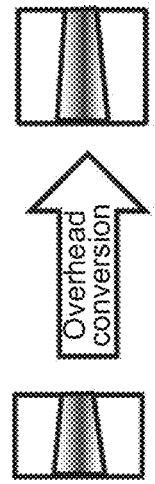

Shape of standing object in periphery of camera optical axis is distorted and is further extended when overhead conversion is performed assuming that partial image thereof is road surface

FIG.6A

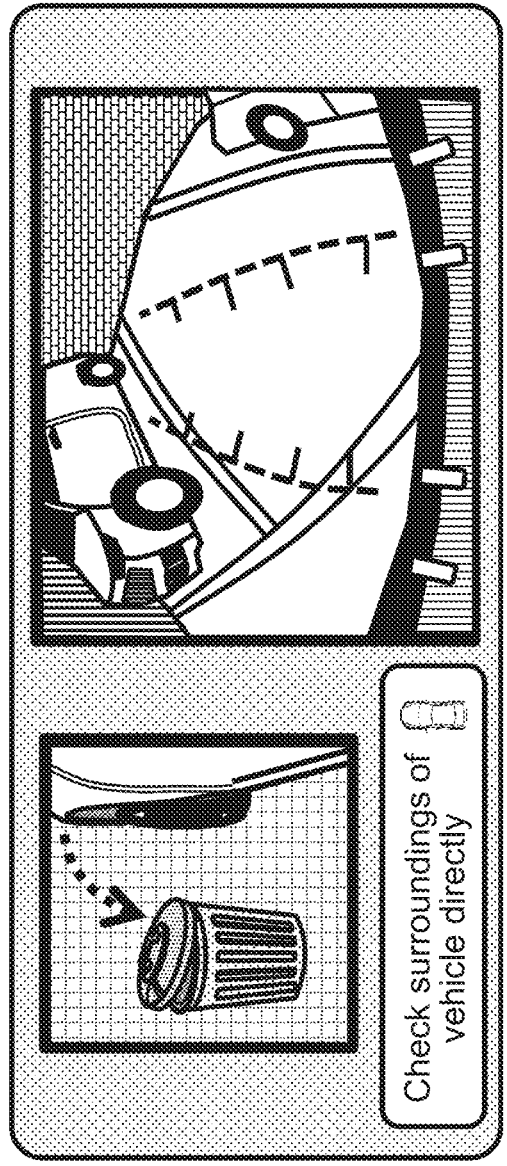
FIG. 18A Display at time of steering-wheel right-rotation backing
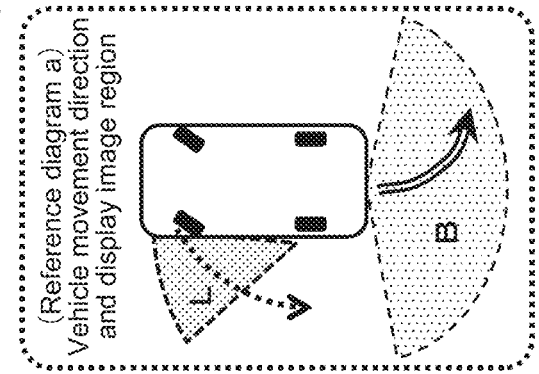
(Reference diagram a) Vehicle movement direction and display image region
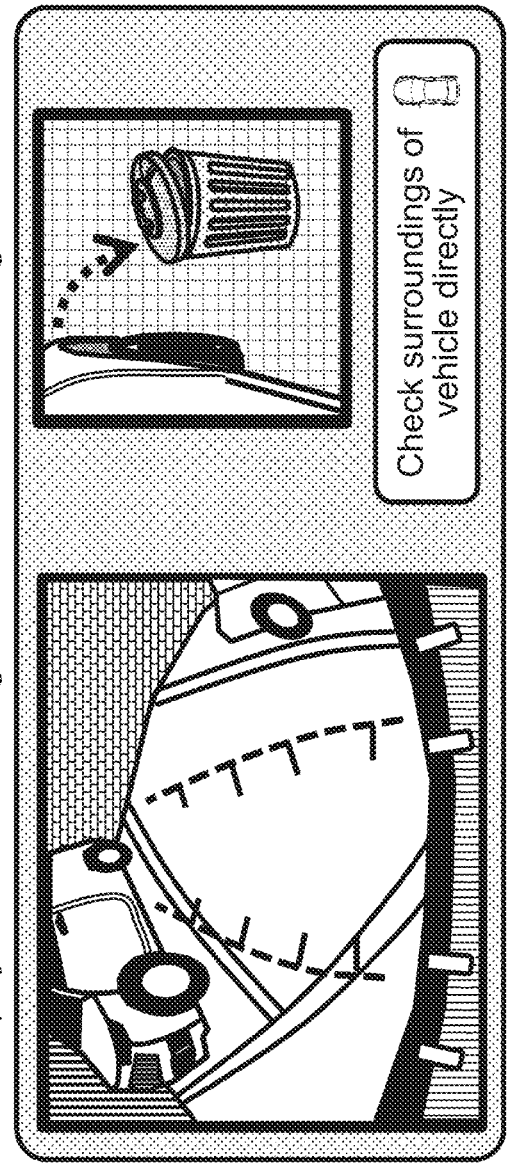
FIG. 18B Display at time of steering-wheel left-rotation backing
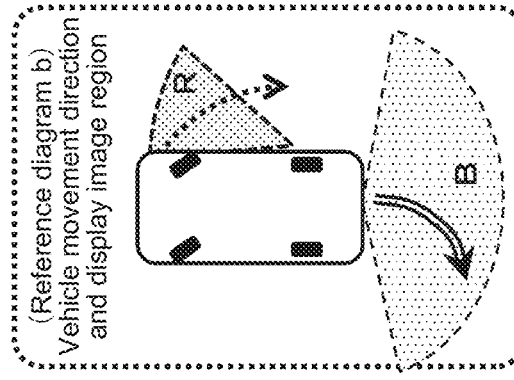
(Reference diagram b) Vehicle movement direction and display image region

| | | Direction of rotation of steering wheel and display image | | | Display mode of lateral side image |
|---|---|---|---|---|---|
| | | Straight | Right rotation | Left rotation | |
| Vehicle travel direction | Forward travel | (S01)<br>· Overhead image<br>· Travel direction image | (S06)<br>· Overhead image<br>· Travel direction image<br>· Vehicle rear right side image | (S05)<br>· Overhead image<br>· Travel direction image<br>· Vehicle rear left side image | Display range having involving hit risk due to inner wheel difference as rearward image of semi-central projection |
| | Rearward travel | (S02)<br>· Overhead image<br>· Travel direction image | (S03)<br>· Overhead image<br>· Travel direction image<br>· Vehicle front left side image | (S04)<br>· Overhead image<br>· Travel direction image<br>· Vehicle front right side image | Display range having expanding hit risk due to outer wheel difference as forward image of semi-central projection |

FIG.25

IMAGE PROCESSING APPARATUS AND IMAGE PROCESSING METHOD TO GENERATE AND DISPLAY AN IMAGE BASED ON A VEHICLE MOVEMENT

CROSS REFERENCE TO RELATED APPLICATIONS

This application is a U.S. National Phase of International Patent Application No. PCT/JP2017/026413 filed on Jul. 21, 2017, which claims priority benefit of Japanese Patent Application No. JP 2016-161826 filed in the Japan Patent Office on Aug. 22, 2016. Each of the above-referenced applications is hereby incorporated herein by reference in its entirety.

TECHNICAL FIELD

The present disclosure relates to an image processing apparatus, an image processing method, and a program. Specifically, the present disclosure relates to an image processing apparatus, an image processing method, and a program with which images photographed by a camera installed in a vehicle and composite images based on photographed images are displayed on a display unit (monitor) which a driver can observe, to thereby enable the driver to check vehicle surrounding conditions.

BACKGROUND ART

In a case where states in a travel direction of a car, for example, such as the direct front, sides, or rear of the car cannot be visually recognized directly from a driver seat, there is a risk that the car may hit a hidden obstacle present in the travel direction. One of systems to avoid such a risk is an image-presenting system to generate a virtual image showing a view from above the car on the basis of images photographed by a plurality of wide-angle cameras mounted on the front, rear, and sides of the car and displays them on a display unit of a driver seat.

It should be noted that the image showing a view observed from above the car is called "around-view (registered trademark) image", "overhead image", "bird's-eye view image", or the like. Hereinafter, in this specification, the image showing a view observed from above the car will be described as the "overhead image".

A configuration to further display an image showing a view in a vehicle travel direction in the image (overhead image) showing a view observed from above the car, for example, a system to display a photographed image of the rear next to the overhead image at the time of reversing (backing) of the car has also already been productized.

In North America, legal safety standards relating to obligation to present an image showing a view in a backing direction, which is information regarding the travel direction when a vehicle is backed, to a driver are defined. A configuration to present the image showing a view in the travel direction as described above is essential.

However, for example, in a case of backing while making a large curve in parking in a garage or the like, an obstacle on a left or right side of the vehicle is insufficiently checked only with an image showing a view from above the vehicle (overhead image) and an image showing a view in a rear direction which is the travel direction. Thus, there is a risk that the side of the vehicle may hit the obstacle.

The overhead image includes images of predetermined ranges around the vehicle, which show views in front, rear, left, and right directions of the vehicle. When taking an image of a stereoscopic object standing on a road surface in image conversion processing when generating an overhead image, the taken image is considered as being generally a pattern on the road surface without considering an original three-dimensional shape of the image, and the captured image is converted into the overhead image of the road surface virtually as the pattern on the road surface. Therefore, the image of the stereoscopic object, which is not present on the road surface, is distorted. It is thus difficult for the driver to accurately grasp a height of each display object (object) displayed in that overhead image showing a view from above and a perceived horizontal distance thereto.

The overhead image is generated as a composite image of images photographed by a plurality of cameras mounted in a periphery of the vehicle, for example, a composite image of images photographed by four cameras mounted on front, rear, left, and right parts of the vehicle.

The cameras mounted in the periphery of the vehicle each utilize a wide-angle lens such as a fisheye lens in order to photograph images of a wide viewing-angle region from a close distance. However, an image photographed by the wide-angle lens not using a central projection method causes a larger image distortion as compared to an image directly viewed when we generally view an object. In particular, in a case where a captured image is converted into an image at a different viewpoint and is viewed assuming that it is present on a particular spatial plane, an arbitrary target object whose projected image is expanded three-dimensionally in a world space causes a large distortion.

In conversion when generating an image called overhead image, assuming that a captured surrounding space extends in the surroundings of the vehicle body on a plane on which the wheels of the vehicle body are placed, overhead images photographed by the respective cameras at the positions of the cameras mounted on the vehicle body are generated and an overhead image to be displayed is generated by performing image correction processing such as composition of those respective images photographed by the plurality of cameras.

It should be noted that, for example, Patent Literature 1 (Japanese Patent Application Laid-open No. 2015-119225) has disclosed a conventional technology regarding the overhead image generation processing. Patent Literature 1 has disclosed a configuration to generate a composite image showing a view from above a car by performing overhead conversion on images photographed by image pickup apparatuses mounted in a periphery of a vehicle to combine them. Patent Literature 1 employs a configuration in which two corrected images are alternately displayed in a strip shape for a combined region of two overhead images which are targets to be combined.

However, unlike an image captured by a telecentric optical system truly from above the vehicle, which shows a stereoscopic object as it is actually viewed from above, an image of the shape of each object included is distorted in a case of a display image obtained by converting the images captured by the wide-angle cameras mounted on the sides of the vehicle into the overhead image showing a view virtually from above the vehicle. It is thus difficult to accurately judge a perceived distance from the vehicle body. In particular, it is difficult to accurately grasp a perceived distance from the vehicle body, which depends on a height of the object. In some cases, the driver cannot accurately judge a risk that the vehicle may hit each display object (object) displayed in the overhead image.

CITATION LIST

Patent Literature

Patent Literature 1: Japanese Patent Application Laid-open No. 2015-119225
Patent Literature 2: Japanese Patent Application Laid-open No. 2005-339313

DISCLOSURE OF INVENTION

Technical Problem

The present disclosure has been made of the above-mentioned problem, for example, and aims at providing an image processing apparatus, an image processing method, and a program with which images photographed by a camera installed in a vehicle and composite images based on photographed images are displayed on a display unit (monitor) which the driver can observe, to thereby enable the driver to more surely check vehicle surrounding conditions.

Solution to Problem

In accordance with a first aspect of the present disclosure, an image processing apparatus includes
an image processing unit that generates a display image for a display unit, which is visually recognizable by a vehicle operator, in which
the image processing unit
receives an image photographed by a camera that photographs surroundings of a vehicle,
generates, on the basis of the received photographed image,
a vehicle travel direction image, and
a vehicle lateral side image corresponding to a vehicle movement direction which is either left or right of the vehicle, and
outputs the generated vehicle travel direction image and the generated vehicle lateral side image to the display unit.

In addition, in accordance with a second aspect of the present disclosure,
an image processing method to be executed in an image processing apparatus including an image processing unit that generates a display image for a display unit, which is visually recognizable by a vehicle operator, the image processing method includes:
by the image processing unit,
receiving an image photographed by a camera that photographs surroundings of a vehicle;
generating, on the basis of the received photographed image, a vehicle travel direction image and a vehicle lateral side image corresponding to a vehicle movement direction which is either left or right of the vehicle; and
outputting the generated vehicle travel direction image and the generated vehicle lateral side image to the display unit.

In addition, in accordance with a third aspect of the present disclosure,
a program causes image processing to be executed in an image processing apparatus including an image processing unit that generates a display image for a display unit, which is visually recognizable by a vehicle operator, the program causing the image processing unit to execute:
processing of receiving an image photographed by a camera that photographs surroundings of a vehicle;
processing of generating, on the basis of the received photographed image, a vehicle travel direction image and a vehicle lateral side image corresponding to a vehicle movement direction which is either left or right of the vehicle; and
processing of outputting the generated vehicle travel direction image and the generated vehicle lateral side image to the display unit.

It should be noted that the program of the present disclosure is, for example, a program that can be provided to an image processing apparatus or a computer system, which is capable of executing various program codes, through a storage medium provided in a computer readable manner or through a communication medium. By providing such a program in a computer readable manner, processing according to the program is performed in the information processing apparatus or the computer system.

Additional other objects, characteristics, and advantages of the present disclosure will be clear through a more detailed description based on an embodiment of the present invention to be described later and the accompanying drawings. It should be noted that the term "system" set forth herein is a logical complex configuration of a plurality of apparatuses and apparatuses with various configurations are not necessarily provided in the same housing.

Advantageous Effects of Invention

In accordance with the configuration of the embodiment of the present disclosure, an image processing apparatus that achieves image display with improved visibility of information regarding the surroundings of a vehicle is realized.

In accordance with the configuration of the present invention, an image processing apparatus that achieves image display with improved visibility of information regarding the surroundings of a vehicle is realized.

It should be noted that effects set forth herein are merely exemplary and are not limitative and additional effects may be provided.

BRIEF DESCRIPTION OF DRAWINGS

[FIGS. 2A and 2B] Diagrams describing an example of mounting cameras to the vehicle.
[FIGS. 3A and 3B] Diagrams describing an example of a image photographed by using a wide-angle lens.
[FIGS. 4A and 4B] Diagrams describing overhead conversion that is a correction example of the image photographed by using the wide-angle lens.
[FIGS. 5A, 5B, 5C, and 5D] Diagrams describing overhead conversion that is a correction example of the image photographed by using the wide-angle lens.
[FIGS. 6A and 6B] Diagrams describing overhead conversion that is a correction example of the image photographed by using the wide-angle lens.

[FIGS. 18A and 18B] Diagrams describing an example of the display image of the display unit.

FIG. 20 A diagram describing an example of the display image of the display unit.

FIG. 21 A diagram describing an example of the display image of the display unit.

FIG. 25 A diagram describing a shift processing example of the display image of the display unit which depends on the vehicle conditions.

MODE(S) FOR CARRYING OUT THE INVENTION

Hereinafter, an image processing apparatus, an image processing method, and a program of the present disclosure will be described in detail with reference to the drawings. It should be noted that descriptions thereof will be made in accordance with the following items.
1. Regarding Example of Display Image of Display Unit of Vehicle
2. Regarding Problem in Observed Image (Overhead Image) Based on Virtual Viewpoint from above Vehicle
3. Regarding Image Display Configuration Having Improved Safety when Vehicle Travels
4. Regarding Other Image Display Examples on Display Unit
4-1. Other Image Display Example 1
4-2. Other Image Display Example 2
5. Regarding Other Embodiments
6. Regarding Configuration Example of Image Processing Apparatus
7. Conclusion of Configuration of Present Disclosure

[1. Regarding Example of Display Image of Display Unit of Vehicle]

First of all, an example of a display image of a display unit of a vehicle will be described.

Figure 1:
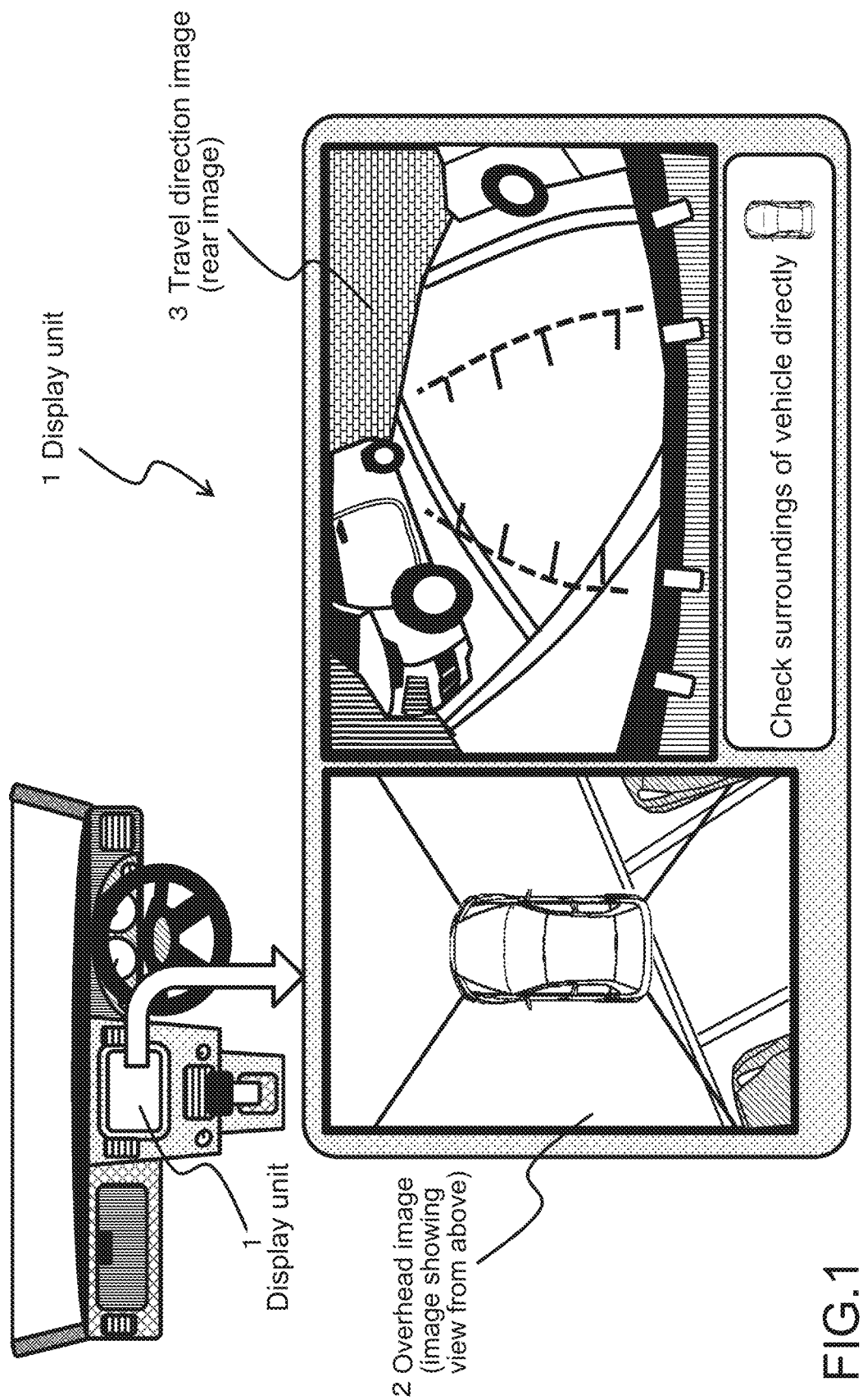
[FIG. 1] A diagram describing an image display example on a display unit of a vehicle.

FIG. 1 is a diagram showing an example of a configuration of a dashboard in front of a driver on a car seat and a display image to be displayed on a display unit 1 provided in the dashboard.

The display unit 1 is set at a position such that the driver of the car can view it while driving.

As shown in FIG. 1,
an overhead image 2 that is an image showing a view observed from above the car, and
a travel direction image 3 (=a rear image) that is an image showing a view in the travel direction of the car are arranged and displayed on the display unit 1.

It should be noted that the display image example of the display unit 1 shown in FIG. 1 is an image display example in a case where the car is backed, i.e., travels rearward, and is an example in which the rear image is displayed as the travel direction image 3.

The overhead image 2 is a composite image generated by combining a plurality of overhead images generated by performing overhead conversion on each of images photographed by cameras mounted at a plurality of points such as the front, rear, left, and right of the car, and is a virtual image corresponding to a case of observing the car and the surroundings thereof from above the car.

It should be noted that the overhead image 2 includes an image spuriously generated, which shows the shape of its own vehicle, and the driver is enabled to check surrounding conditions of its own vehicle.

The travel direction image 3 (=the rear image) is an image generated by performing overhead conversion, cutting processing, and the like on the image photographed by the camera mounted on the back of the car, for example.

Such image processing on the photographed image is performed at an image processing unit inside the vehicle.

An example of mounting the cameras that photograph images to be required for generating the display image for the display unit 1 will be described with reference to FIGS. 2A and 2B.

FIGS. 2A and 2B are diagrams describing an example of the example of mounting the cameras on the vehicle.

As shown in FIGS. 2A and 2B, four cameras are mounted on a vehicle 10, for example, at respective positions of the front, rear, left, and right.

The four cameras are mounted as follows:
a camera F21 is mounted on a front surface of the vehicle 10;
a camera L22 is mounted on a left surface of the vehicle 10;
a camera R23 is mounted on a right surface of the vehicle 10; and
a camera B24 is mounted on a back surface of the vehicle 10.

As shown in a camera configuration of FIG. 2B, each of the cameras F21 to R24 includes a wide-angle lens such as a fisheye lens, for example, and is configured to photograph the ground and a stereoscopic object and the like on the ground over a wide range by using a downward direction (ground direction) or an obliquely lateral direction with respect to a vehicle body at a viewing angle including the ground direction as a photographing direction.

A distortion of an image excluding the optical axis is caused in an image photographed by using the wide-angle lens as compared to a projection method which is a central projection for photographs which is generally familiar. An example of a photographed image showing a view of a vertically lower region by using the wide-angle lens will be described with reference to FIGS. 3A and 3B.

FIG. 3A shows a photographing environment. An object to be photographed 31 is a grid pattern drawn on a horizontal plane ground. Photographing is performed by setting a wide-angle fisheye camera 30 above the center of the object to be photographed 31 while an optical axis thereof is directed vertically downward.

The camera 30 is a camera with a wide-angle lens such as a fisheye lens, for example.

A photographed image shown in FIG. 3B is an example of an image photographed by using the fisheye lens in a photographing environment shown in FIG. 3A.

As shown in the photographed image of FIG. 3B, the grid pattern of the ground in the photographed image has a distortion curved in a barrel-shape.

That is a distortion of an image which is caused by photographing using a wide-angle fisheye lens.

In order to generate an image having a shape similar to the object to be photographed on the road surface by removing a distortion of the photographed image shown in FIG. 3B, it is necessary to assume that target images captured by the cameras are all located on the corresponding virtual road surface and perform overhead conversion on the assumption that an image is present on the virtual road surface on the basis of a correspondence between projection images depending of incident angles on the fisheye lens. It should be noted that an example of such overhead conversion processing is described in, for example, Patent Literature 2 (Japanese Patent Application Laid-open No. 2005-339313).

Such correction processing example will be described with reference to FIGS. 4A and 4B and the subsequent figures.

FIGS. 4A and 4B show "FIG. 4A Photographed image" similar to FIG. 3B and "FIG. 4B Corrected image (overhead image)" generated by correction processing (overhead conversion) on the photographed image. Although not shown in the figure, the optical axis of the wide-angle fisheye camera does not necessarily need to be directed in the vertical direction, and may be directed in the obliquely lateral direction with respect to the vehicle body. Here, a standing object is viewed obliquely from the side in a case where a stereoscopic object on a road surface is present and where the position of that stereoscopic object is different from the position of the camera in a direction vertical to the road surface.

A problem thereof will be briefly described with reference to FIGS. 5A, 5B, 5C, 5D, 6A, and 6B. There is a standing object 35 in an outer peripheral region directly beneath the camera. By performing conversion on the assumption that the whole image captured by the wide-angle fisheye camera is a pattern of the road surface, the pattern of the standing object, which is located on the road surface, is deviated to the outer periphery of the screen. Then, by further performing overview conversion on the image having the barrel-shaped distortion, it is pushed away from the optical axis. Therefore, the overhead image based on the photographed image as viewed at a distance from above the road surface is as shown in FIG. 5D or FIG. 6B. However, the standing object 35 becomes an image distorted, deformed as in FIG. 5B or FIG. 6A by performing virtual conversion by using a partially cut-out image of the wide-angle fisheye camera, which is obtained from the photographed image at an adjacent position of the road surface, as the overhead image, as shown in FIG. 5C. Depending on the degree of deformation thereof, it becomes difficult for an image observer to recognize the standing object 35 and the visual recognizability is significantly lowered.

It should be noted that the image showing a view observed from above will be referred to as an "overhead image" and the image correction processing of performing conversion into the "overhead image" will be referred to as "overhead conversion". The corrected image shown in FIG. 4B is the "overhead image". Correction processing of generating (FIG. 4B) a corrected image from (FIG. 4A) a photographed image in FIGS. 4A and 4B is equivalent to the "overhead conversion".

(FIG. 4B) the corrected image (overhead image) in FIGS. 4A and 4B is an image having a grid pattern similar to that of the object to be photographed 31 in the photographing environment of FIG. 3A described above and is a correct overhead image as a central projection as the ground is viewed from above. The grid pattern of the ground is one that reproduces the shape of an actual object to be photographed.

The overhead image 2 shown in FIG. 1 is generated by performing image correction processing including the above-mentioned overhead conversion on the images photographed by the four cameras mounted at the respective positions of the front, rear, left, and right of the vehicle 10 shown in FIGS. 2A and 2B and further performing composition processing of combining the respective images with one another.

It should be noted that the travel direction image 3 (=the rear image) shown in FIG. 1 can be acquired by image correction processing and image cutting processing using an image photographed by the camera B, 24 mounted on the rear portion of the vehicle 10 shown in FIGS. 2A and 2B, for example. It should be noted that it is necessary to set a viewpoint direction of the travel direction image 3 (=the rear image) to the travel direction (rearward), not the downward direction as in the overhead image 2, and the travel direction image 3 (=the rear image) can be obtained by performing image conversion in which the viewpoint direction is set to the travel direction (rearward).

It should be noted that there may be employed a configuration in which besides the four cameras mounted at the respective positions of the front, rear, left, and right of the vehicle 10 shown in FIGS. 2A and 2B, a wide-angle camera for photographing the rear or a normal camera as a camera for photographing the rear is mounted and the travel direction image 3 (=the rear image) shown in FIG. 1 is acquired by using an image photographed by that camera for photographing the rear and is displayed.

[ 2. Regarding Problem in Observed Image (Overhead Image) Based on Virtual Viewpoint from above Vehicle]

As described above with reference to FIGS. 2A, 2B, 3A, 3B, 4A, and 4B, the overhead image that is an image showing a view observed from above the vehicle is generated as a composite image of the images photographed by the plurality of cameras mounted in the periphery of the vehicle, for example, a composite image of images photographed by four cameras mounted on the front, rear, left, and right of the vehicle. As described above, the cameras mounted in the periphery of the vehicle each utilize a wide-angle lens such as a fisheye lens in order to photograph images of a wide region from a close distance. However, an image photographed by the wide-angle lens causes a large image distortion. In particular, a large distortion is generated in an image-surrounding region. An overhead image to be displayed is generated by performing correction processing for overcoming those distortions and image correction processing such as composition of the images photographed by the plurality of cameras.

However, as a result of such image correction, the shape of an object standing on a road surface in the display image, which is not present on a road surface of an assumed converted and projected plane, is different from the shape of the actual object in some cases. In particular, the shape of an object near an image composition region changes with high possibility.

Therefore, it is difficult for the driver to accurately grasp a specific shape of each object displayed in the overhead image displayed on the display unit, especially a height of the object and a relative distance from the vehicle body. In some cases, the driver cannot accurately judge a risk that the vehicle may hit a display object in the overhead image.

A specific example will be described with reference to FIG. 7 and the subsequent figures.

Figure 7:
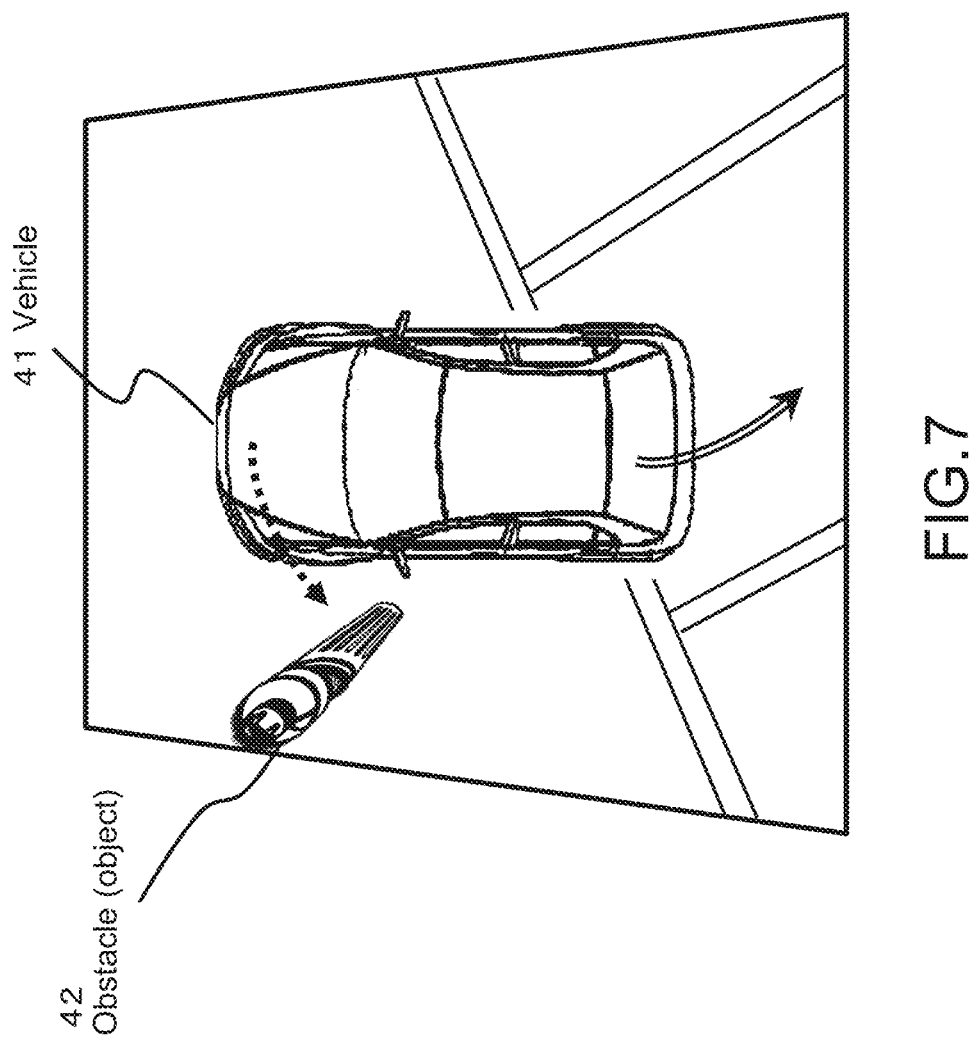
[FIG. 7] A diagram describing an example of a way of the vehicle and an obstacle in the surroundings of the vehicle.

FIG. 7 shows a vehicle 41 backed for parking at one parking position of an parking area.

The vehicle 41 is to be backed to enter a parking space in accordance with the arrow shown in the figure by turning (rotating) a steering wheel to the right.

However, an obstacle (object) 42, i.e., a "trash can" is present on the left side of the vehicle 41 as shown in the figure.

The height of the obstacle (object) 42 cannot be directly observed from the driver because it is lower than a height of the vehicle.

Figure 8:
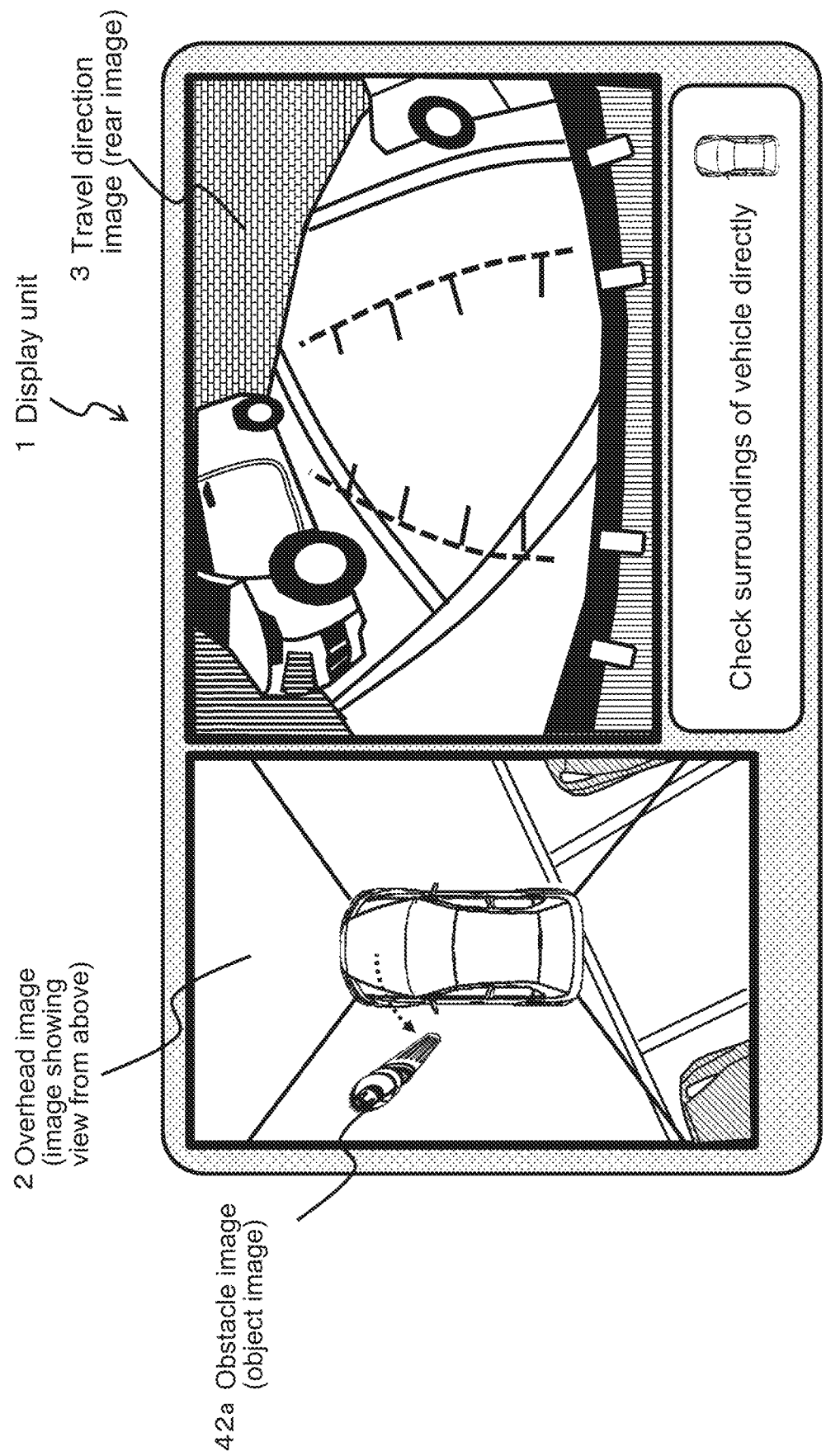
[FIG. 8] A diagram describing a problem in the image display example on the display unit of the vehicle.

At this time, an example of an image displayed on a display unit of the vehicle 41 is shown in FIG. 8.

The display image of the display unit 1 shown in FIG. 8 is an image similar to the display image, which is described above with reference to FIG. 1.

As shown in FIG. 8,
the overhead image 2 that is an image showing a view observed from above the car, and
the travel direction image 3 (=the rear image) that is an image showing a view in the travel direction of the car are arranged and displayed on the display unit 1.

An obstacle (object) image 42*a*, i.e., the image of the "trash can" is displayed in the overhead image 2. However, deformation due to the various types of correction processing and the like in the generation process for the overhead image is large as described above, and thus it is not an image so clear that it can be judged to be the trash can and having a shape maintaining the shape of the trash can.

In particular, regarding a perceived distance from the vehicle body which depends on a height of an obstacle (object) image 42*a*, it cannot be judged at all. There is a possibility that the driver does not remark it because the shape of the obstacle (object) image 42*a* is displayed in a shape distorted and deformed from a shape intuitively viewed from the side. Further, even if the driver remarks something displayed, there is a possibility that the driver judges it to be a stain of the floor, a trash on the floor, or the like. Further, in a case of a flat wall surface or the like, it is difficult even to judge whether it is a wall or a road surface.

When the driver keeps moving the vehicle 41 rearward as it is on the basis of such a wrong judgement, the vehicle body is backed while drawing a sweeping track extended in a lateral-side direction in which the obstacle is present due to a difference between tracks followed by front and back outer wheels when turning (outer wheel difference). As a result, as shown in next FIG. 9, there is a fear that the side surface of the vehicle 41 may hit the obstacle (object) 42, i.e., the "trash can" and the car and the "trash can" may be both damaged.

When the vehicle moves while making a curve by operating the steering wheel, the tracks of the front wheels are different from the tracks of the rear wheels. That is, at the time of backing, a difference between a rear-wheel track and a vehicle-body front portion track is caused due to the outer wheel difference.

Figure 9:
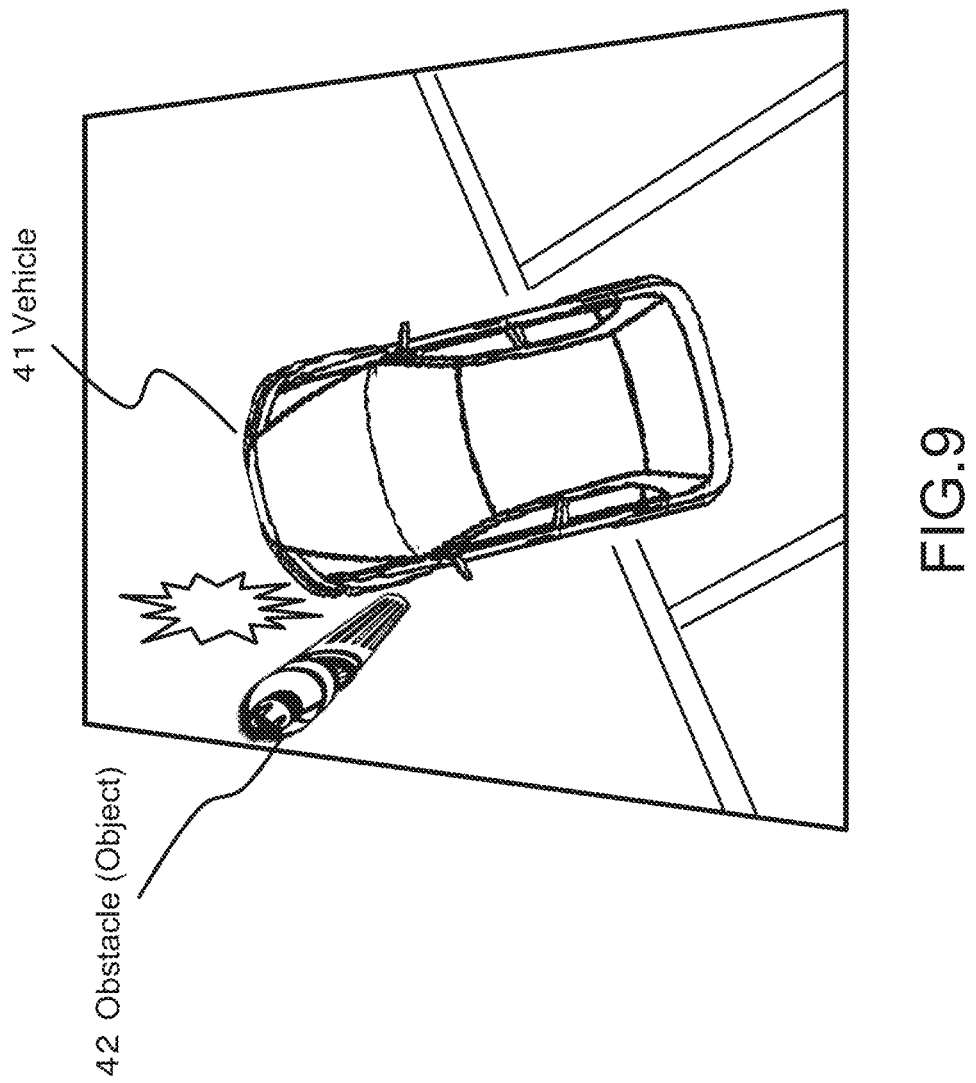
[FIG. 9] A diagram describing a problem in the image display example on the display unit of the vehicle.

As shown in FIGS. 7 to 9, when the vehicle is backed by turning the steering wheel to the right, the tracks of the front wheels are drawn outside the tracks of the corresponding rear wheels. That is, a vehicle front portion is rotated while the track of the vehicle front portion is expanded outward as compared to the track of a vehicle rear portion. As a result, there is a possibility that the left surface of the vehicle hits or crashes into the obstacle at the vehicle front portion, which it does not hit at the vehicle rear portion.

[3. Regarding Image Display Configuration Having Improved Safety when Vehicle Travels]

Next, the above-mentioned problem will be solved and a configuration of the present disclosure, i.e., an image display configuration having improved safety when the vehicle travels will be described.

Figure 10:
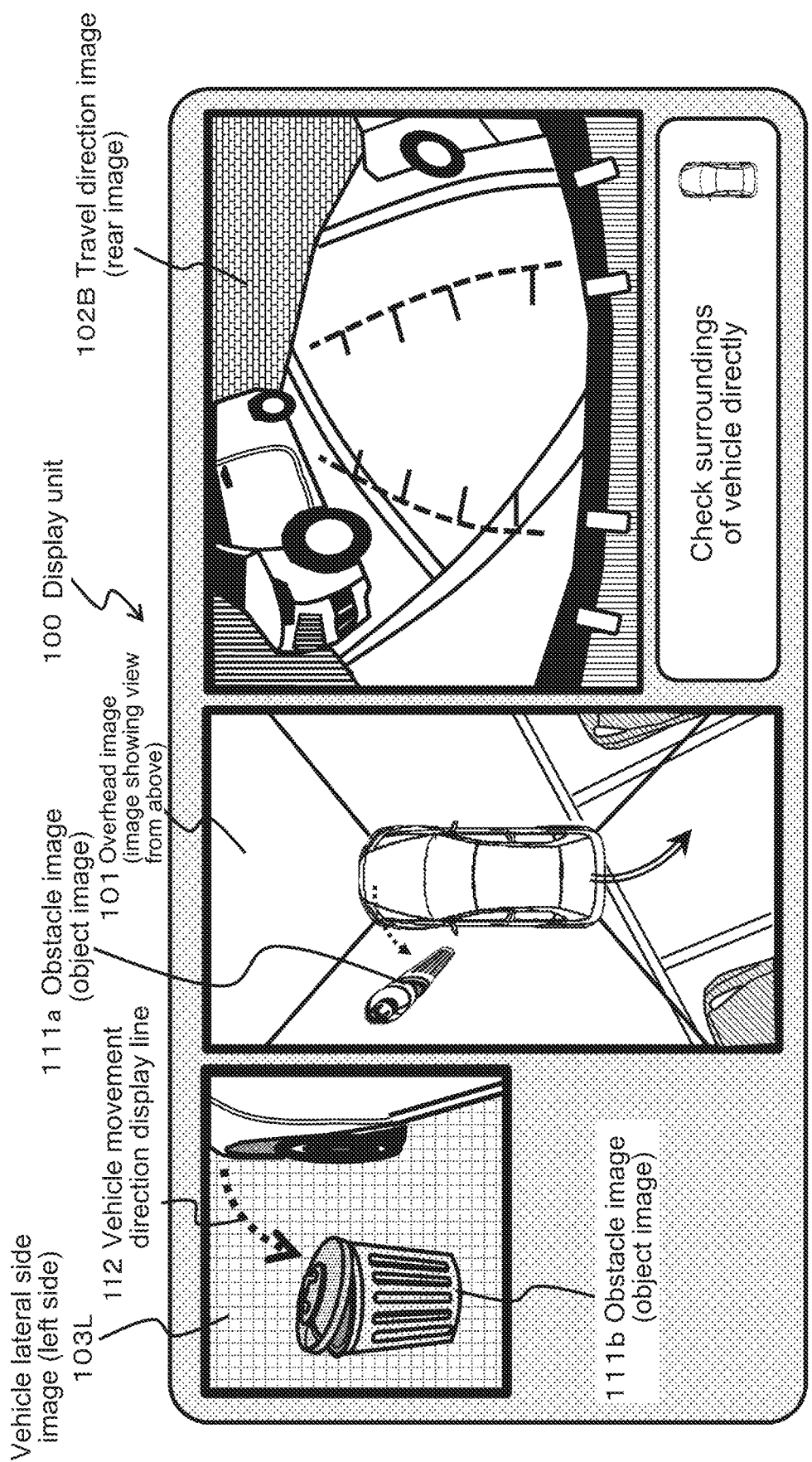
[FIG. 10] A diagram describing an image display example on the display unit of the present disclosure.

FIG. 10 is a diagram showing an image display example of a display unit 100 according to an embodiment of the present disclosure.

A display image of the display unit 100 shown in FIG. 10 includes the following three types of images:
(a) Overhead image 101;
(b) Travel direction image (rear image) 102B; and
(c) Vehicle lateral side image (left side image) 103L.

It should be noted that unless otherwise stated, the vehicle lateral side image may be an image according to a semi-central projection method using a vehicle body side surface as the viewing angle, which includes front wheels and a vehicle-body front portion from a camera-mounting position, an image according to the semi-central projection method using the vehicle body side surface as the viewing angle, which includes rear wheels and a vehicle-body rear portion from the camera-mounting position in a case where the vehicle travels forward, or a part of a camera image of a rear-view mirror replacement called camera monitor system described above.

The two images, (a) Overhead image 101 and (b) Travel direction image (rear image) 102B, are images similar to the images described above with reference to FIG. 1.

It should be noted that as shown in the overhead image 101 at the center of FIG. 10, the example of the display image of the display unit 100 shown in FIG. 10 is an example of the display image of the display unit 100 in a state in which the vehicle is being backed counter-clockwise (leftward) to enter a vehicle parking space by turning the steering wheel to the right.

On the left side of the vehicle, a "trash can" which is an obstacle (object) similar to the one described with reference to FIG. 7 is present.

In the overhead image 101 at the center of FIG. 10, an obstacle image (object image) 111*a* similar to the one described above with reference to FIG. 8 is displayed.

However, there is a fear that the driver cannot correctly recognize the shape and the height of that obstacle image (object image) 111*a* even when viewing it and judges that there is no crash possibility of the vehicle.

(C) Vehicle lateral side image (left side image) 103L shown in FIG. 10 is a new additional image not included in the display image described with reference to FIG. 1.

The vehicle lateral side image (left side image) 103L is an image of a left side of the vehicle.

As described above, in a case where the vehicle backs the vehicle counter-clockwise (leftward) by turning the steering wheel to the right, the tracks of the front wheels are drawn outside the tracks of the corresponding rear wheels. That is, the vehicle front portion is rotated while the track of the vehicle front portion is expanded outward as compared to the track of the vehicle rear portion due to the outer wheel difference. As a result, there is a possibility that the left surface of the vehicle hits or crashes into the obstacle at the vehicle front portion, which it does not hit at the vehicle rear portion.

In this manner, a difference between the track of the vehicle front portion and the track of the rear portion due to the outer wheel difference is generated.

The vehicle lateral side image (left side image) 103L shown in FIG. 10 is an image showing a view at a position at which there is a hit possibility due to that outer wheel difference, i.e., an image showing a view in a direction in which the vehicle is to move. That image showing a view in the vehicle movement direction is displayed on the display unit as the vehicle lateral side image (left side image) 103L.

The vehicle lateral side image (left side image) 103L shown in FIG. 10 includes the left side image of the vehicle itself and a vehicle movement direction display line 112 (guide line) indicating the movement direction of the vehicle is further displayed.

By checking that vehicle lateral side image (left side image) 103L of a central projection image less distorted, which is shown in FIG. 10, and the vehicle movement direction display line 112, the driver can accurately grasp what is an obstacle present in the movement direction of the vehicle and a height thereof and a distance from the vehicle and correctly make a judgement about the crash possibility of the vehicle.

In the vehicle lateral side image (left side image) 103L shown in FIG. 10, the obstacle image (object image) 111b, i.e., the image of the "trash can" is clearly displayed with no distortions. The driver can surely recognize that the "trash can" which the vehicle can hit or crash into is present on a vehicle left side. In addition, a relative relationship between the stereoscopic object and the vehicle body can be checked from the side.

Consequently, the driver can stop causing the vehicle to travel, perform an operation on the steering wheel and the like, change the vehicle travel direction to avoid the obstacle, and cause the vehicle to safely travel.

It should be noted that a guide line indicating the travel direction of the car is displayed also in the overhead image 101 or the travel direction image (rear image) 102B.

An arrow in the overhead image 101 and predicted tracks of left and right wheels or bumper corners of a vehicle body foremost portion, which are shown as the dotted lines in the travel direction image (rear image) 102B, are displayed as the guide line indicating the travel direction of the car.

It should be noted that the example shown in FIG. 10 is an image example in a case where the vehicle is backed counter-clockwise (leftward) by turning the steering wheel of the vehicle to the right. As described above, the front side of the vehicle is rotated while the track of the front side of the vehicle is expanded leftward as compared to the track of the rear side due to the outer wheel difference.

That is, the vehicle front side moves in a left direction. An image of the vehicle lateral side image (left side image) 103L shown in FIG. 10 is displayed as an image showing a view in that movement direction.

On the contrary, in a case where the vehicle is backed clockwise (rightward) by turning the steering wheel of the vehicle to the left, the front side of the vehicle is rotated while the track of the front side of the vehicle is expanded rightward as compared to the track of the rear side.

That is, the vehicle front side moves in a right direction. In this case, an image of a right side of the vehicle, not the vehicle lateral side image (left side image) 103L shown in FIG. 10, is displayed as an image showing a view in that movement direction. It should be noted that a display example of that image will be described later.

In the image display example shown in FIG. 10, the vehicle lateral side image (left side image) 103L is set to be displayed in a front left region of the overhead image 101 displayed at the center.

It is an image layout for making it easy for the driver who views the display unit 100 to intuitively grasp that the vehicle lateral side image (left side image) 103L is an image of a front left side of the vehicle.

The following two images, which are the display images of the display unit 100 shown in FIG. 10, i.e.,
the vehicle lateral side image (left side image) 103L, and
the travel direction image (rear image) 102B
will be described in more detail with reference to FIG. 11.

Figure 11:
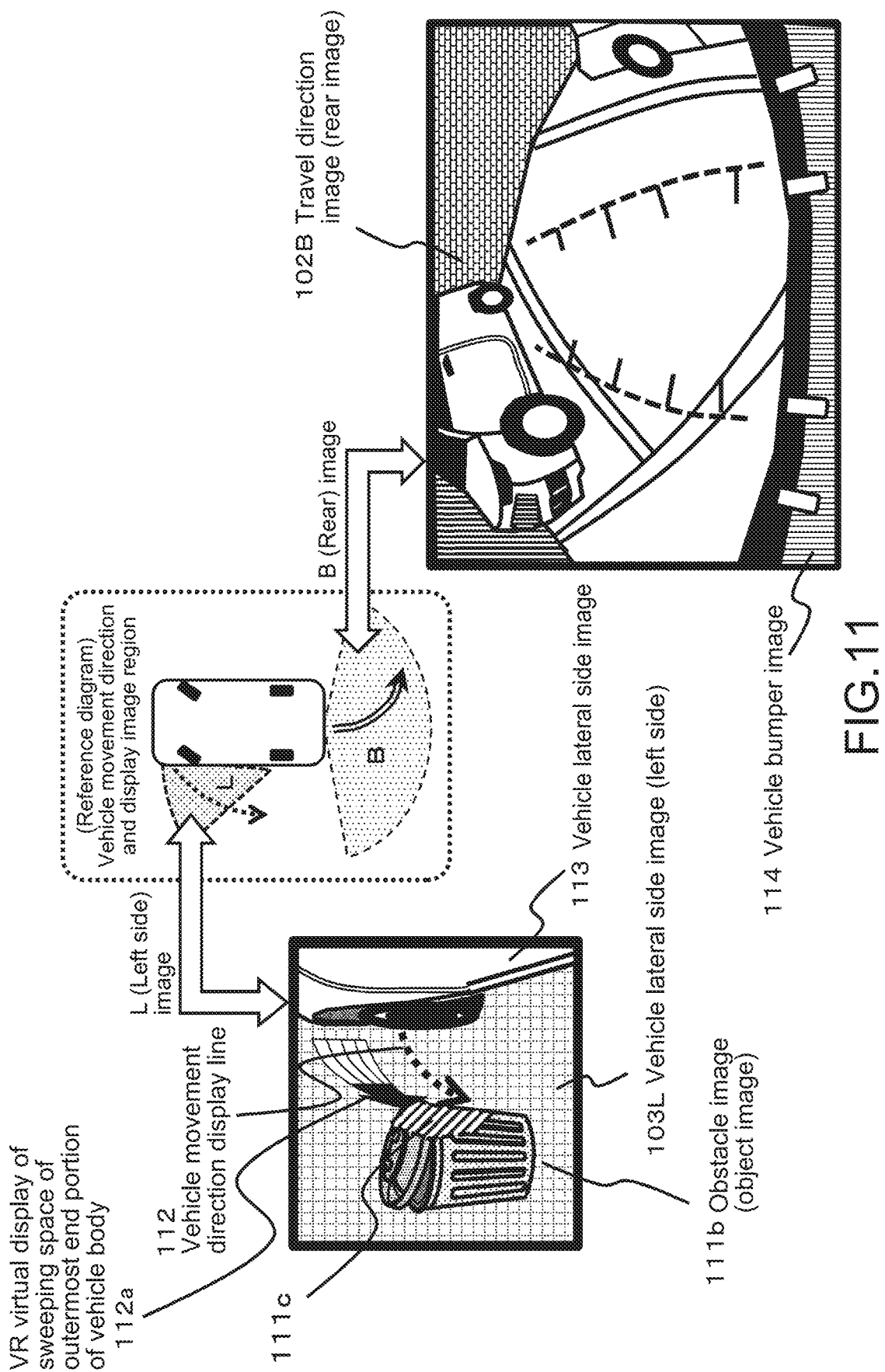
[FIG. 11] A diagram describing an example of the display image of the display unit.

At the center of FIG. 11, a diagram for describing a movement direction of the vehicle and a display image region is shown as (Reference diagram).

The vehicle is set to be reversed (backed) by turning the steering wheel to the right.

In this setting, the vehicle is to move rearward as shown in the double-line arrow in (Reference diagram) rearward and substantially the front half of the vehicle is to move in the left direction as shown in the double-line arrow.

A rear image of the vehicle shown in the double-line arrow in (Reference diagram) shown in FIG. 11 is the travel direction image (rear image) 102B shown on the right side of FIG. 11.

Further, the image of the left side of the vehicle which is shown as the dotted-line arrow in (Reference diagram) is the vehicle lateral side image (left side) 103L shown on the left side of FIG. 11.

A fan-shaped region B in (Reference diagram) corresponds to an image region of the travel direction image (rear image) 102B which is shown substantially on the right side of FIG. 11 and a fan-shaped region L in (Reference diagram) corresponds to an image region of the vehicle lateral side image (left side) 103L which is shown substantially on the left side of FIG. 11.

In the vehicle lateral side image (left side) 103L shown on the left side of FIG. 11, the vehicle movement direction display line 112 is displayed while overlapping the image.

That vehicle movement direction display line 112 is a line indicating a movement direction of the vehicle, which is determined in accordance with a steering-wheel operation of the vehicle.

The image processing unit inputs steering-wheel operation information of the vehicle, calculates a movement direction of the vehicle on the basis of the input steering-wheel operation information of the vehicle, determines a drawing line in accordance with the movement direction of the vehicle, which is determined in accordance with the result of calculation, superimposes the vehicle movement direction display line 112 on the image, and outputs them. Coordinates of the drawing line may form a line drawing a track at an outermost point on the road surface, which is swept by the vehicle body, or may form an expanded track line considering a margin of a certain safety margin (e.g., 10 cm). A setting like a VR virtual display 112a of a sweeping space of an outermost end portion of the vehicle body may be employed. Further, a drawing line depending on an amount of turning of the steering wheel or a track at the time of maximally turning the steering wheel may be additionally displayed or may be alternatively displayed. In addition, an image processing apparatus installed in the vehicle may be caused to perform a hollow-coordinate arithmetic processing and display target-object coordinates as hollow coordinates and perform color change processing of a hollow space at a hit site or perform display with emphasis by drawing a pattern as in an obstacle partial region image 111c in FIG. 11.

Further, the vehicle lateral side image (left side) 103L is set to include an image of a side region of the vehicle, i.e., a vehicle lateral side image 113.

By providing the display image with the vehicle lateral side image 113 in this manner, it becomes possible to accurately grasp the distance from the vehicle to the obstacle and the size of the obstacle.

It should be noted that a setting to also provide the travel direction image (rear image) 102B shown in FIG. 11 with a vehicle bumper image 114 which is a part of the rear portion of the vehicle is employed.

By providing the display image with a vehicle bumper image 114 which is an end portion region image of the vehicle itself in this manner, it becomes possible to accurately grasp the distance from the vehicle to the obstacle and the size of the obstacle.

It should be noted that the vehicle lateral side image (left side) 103L and the travel direction image (rear image) 102B which are shown in FIGS. 10 and 11 can be acquired in such a manner that the image processing unit inside the vehicle inputs the images photographed by the four cameras mounted at the respective positions of the front, rear, left, and right of the vehicle, which are described above with reference to FIGS. 2A and 2B, and performs image correction processing such as overhead conversion and image cutting processing applying those input images.

Alternatively, there may be employed a configuration in which dedicated cameras that photograph the vehicle lateral side image (left side) 103L and the travel direction image (rear image) 102B which are shown in FIGS. 10 and 11 are mounted on the vehicle and an image to be displayed is generated by using images photographed by those cameras.

That is, there may be employed a configuration in which wide-angle cameras or normal cameras as dedicated cameras which are a camera that photographs a region from the lateral side to the front of the vehicle and a camera that photographs the rear of the vehicle are mounted on the vehicle and the image processing apparatus inside the vehicle inputs images photographed by those cameras and generates and displays the vehicle lateral side image (left side) 103L and the travel direction image (rear image) 102B which are shown in FIGS. 10 and 11.

The image display examples of the display unit 100, which have been described with reference to FIGS. 10 and 11, are image examples in a case where the vehicle is backed counter-clockwise (leftward) by turning the steering wheel of the vehicle to the right as it is understood from the overhead image 101 at the center of FIG. 10 and (Reference diagram) of FIG. 11.

Next, an example of the display image of the display unit 100 in a case where the vehicle is backed clockwise (rightward) by turning the steering wheel of the vehicle to the left will be described with reference to FIG. 12.

Figure 12:
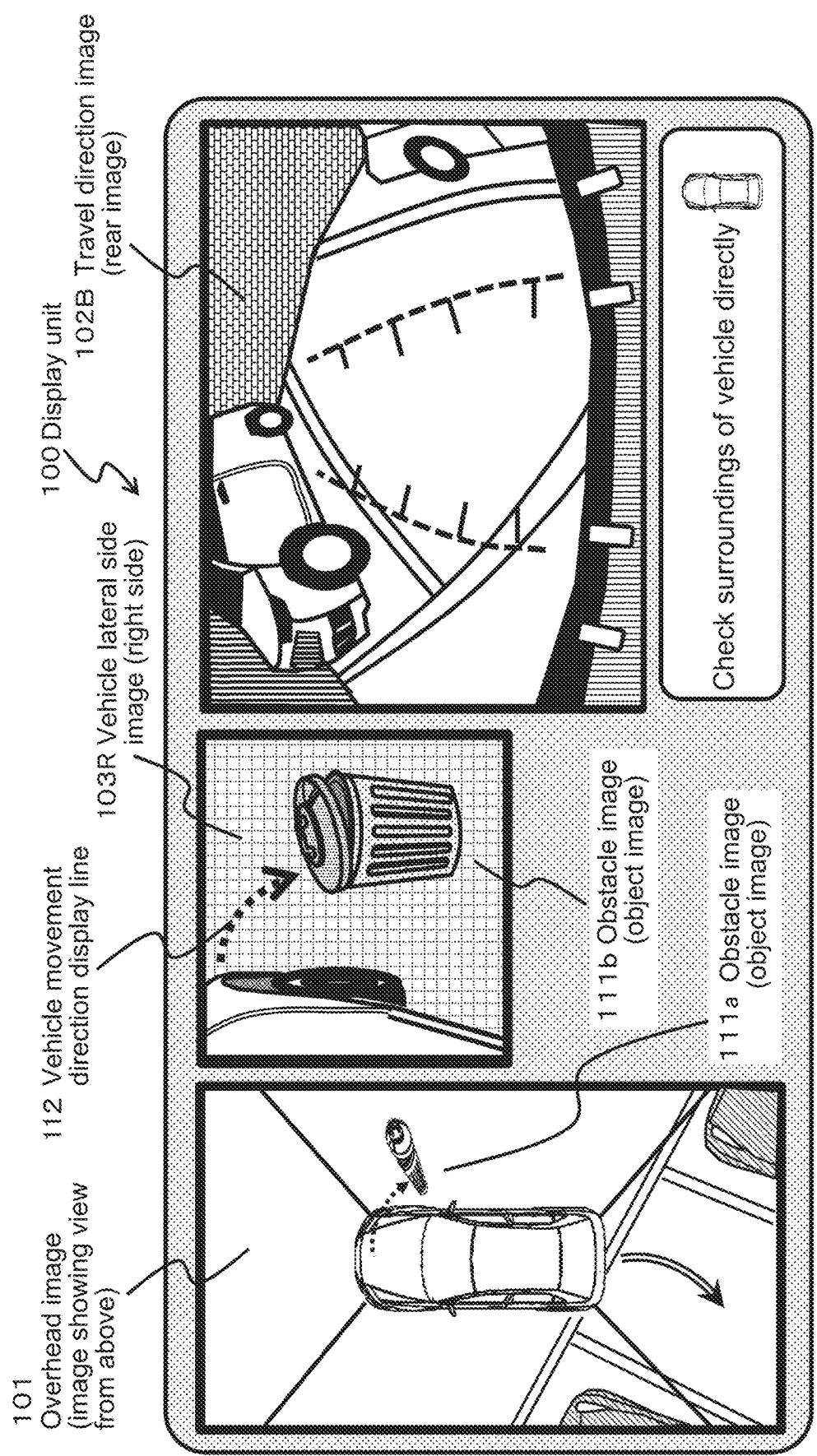
[FIG. 12] A diagram describing an example of the display image of the display unit.

As shown in FIG. 12, the display image of the display unit 100 includes the following three types of images:

(a) Overhead image 101;
(b) Travel direction image (rear image) 102B; and
(c) Vehicle lateral side image (right side image) 103R.

The two images, (a) Overhead image 101 and (b) Travel direction image (rear image) 102B, are images similar to the images described above with reference to FIG. 10.

In the example shown in FIG. 12, an obstacle image (object image) 111a is displayed on the right side of the vehicle as shown in the overhead image 101.

However, the driver cannot recognize the shape and the height of that obstacle image (object image) 111a even when viewing it and judges that there is no crash possibility of the vehicle.

(C) Vehicle lateral side image (right side image) 103R shown in FIG. 12 is an image of the right side of the vehicle.

In a case where the vehicle backs the vehicle clockwise (rightward) by turning the steering wheel to the left, the tracks of the front wheels are drawn outside the tracks of the corresponding rear wheels. That is, the vehicle front portion is rotated while the track of the vehicle front portion is expanded outward as compared to the track of the vehicle rear portion. As a result, there is a possibility that the right surface of the vehicle hits or crashes into the obstacle at the vehicle front portion, which it does not hit at the vehicle rear portion.

That is, a difference between the track of the vehicle front portion and the track of the rear portion due to the outer wheel difference is generated.

The vehicle lateral side image (right side image) 103R shown in FIG. 12 is an image showing a view at a position at which there is a hit possibility due to that outer wheel difference, i.e., an image showing a direction in which the vehicle is to move. That image is displayed on the display unit.

In the vehicle lateral side image (right side image) 103R shown in FIG. 12, the vehicle movement direction display line 112 including the right side image of the vehicle itself and indicating the movement direction of the vehicle is displayed.

By viewing the vehicle lateral side image (right side image) 103R shown in FIG. 12 and the vehicle movement direction display line 112, the driver can accurately grasp what is an obstacle present in the movement direction of the vehicle and a height thereof and a distance from the vehicle and correctly make a judgement about the crash possibility of the vehicle.

In the vehicle lateral side image (right side image) 103R shown in FIG. 12, the obstacle image (object image) 111b, i.e., the image of the "trash can" is clearly displayed. The driver can surely recognize that the "trash can" which the vehicle can hit or crash into is present on a vehicle right side.

Consequently, the driver can stop causing the vehicle to travel, perform an operation on the steering wheel and the like, change the vehicle travel direction to avoid the obstacle, and cause the vehicle to safely travel.

It should be noted that the layout of the three images of the display unit 100 shown in FIG. 12 is different from the image layout in FIG. 10 described above.

That is, in the image display example of the display unit 100 shown in FIG. 12, the vehicle lateral side image (right side image) 103R is set to be displayed in a front right region of the overhead image 101.

It is an image layout for making it easy for the driver who views the display unit 100 to intuitively grasp that the vehicle lateral side image (right side image) 103R is an image of a front right side of the vehicle.

The following two images, which are the display images of the display unit 100 shown in FIG. 12, i.e.,
the vehicle lateral side image (right side image) 103R, and
the travel direction image (rear image) 102B will be described in more detail with reference to FIG. 13.

Figure 13:
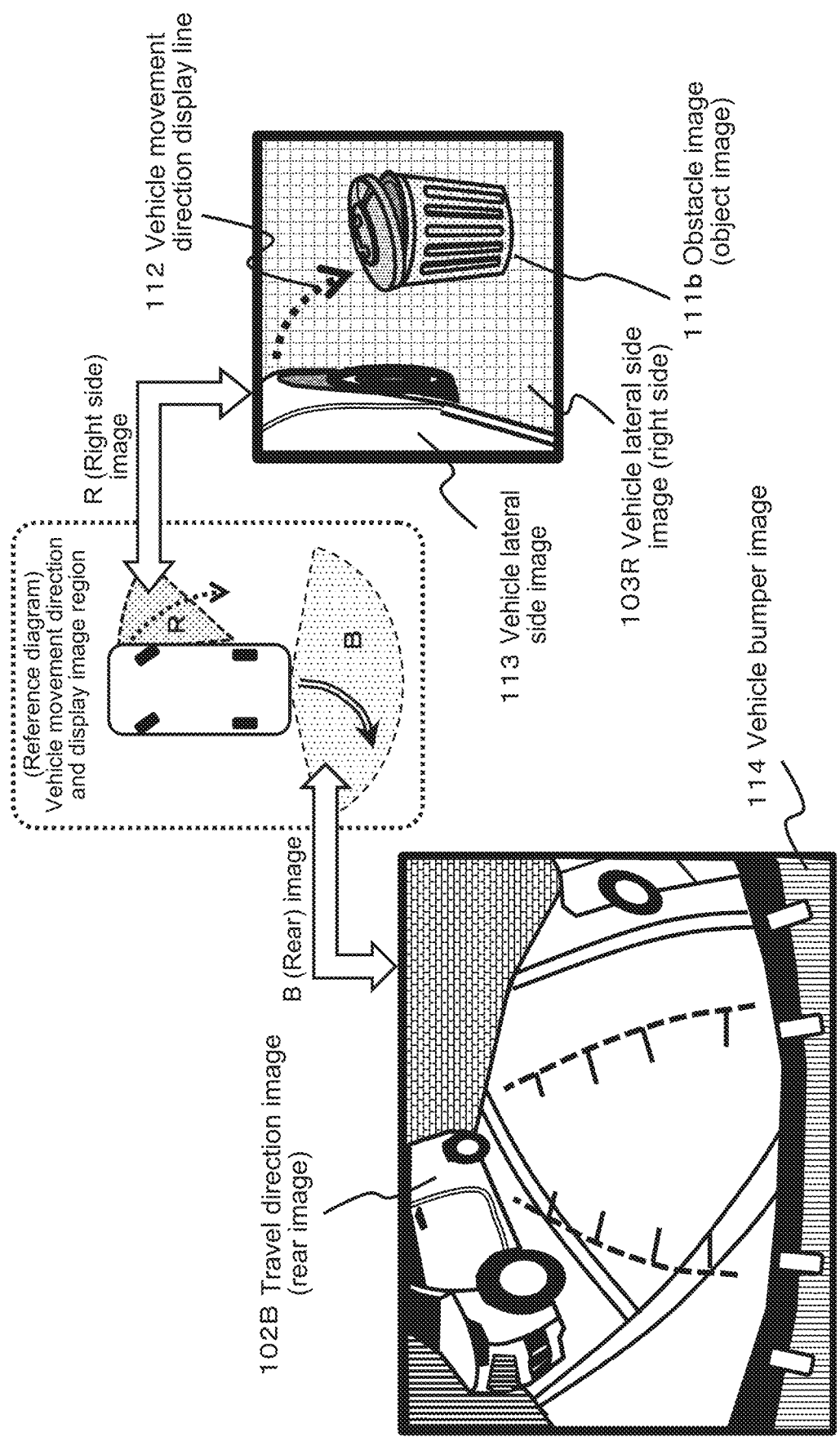
[FIG. 13] A diagram describing an example of the display image of the display unit.

At the center of FIG. 13, a diagram for describing a movement direction of the vehicle and a display image region is shown as (Reference diagram).

The vehicle is set to be reversed (backed) by turning the steering wheel to the left.

In this setting, the vehicle is to move rearward as shown in the double-line arrow in (Reference diagram) and substantially the front half of the vehicle is to move in the right direction as shown in the double-line arrow.

A rear image of the vehicle shown in the double-line arrow in (Reference diagram) shown in FIG. 13 is the travel direction image (rear image) 102B shown on the left side of FIG. 13.

Further, an image of the right side of the vehicle which is shown as the dotted-line arrow in (Reference diagram) is a vehicle lateral side image (right side) 103R shown on the right side of FIG. 13.

A fan-shaped region B in (Reference diagram) corresponds to an image region of the travel direction image (rear image) 102B which is shown substantially on the left side of FIG. 13 and a fan-shaped region R in (Reference diagram) corresponds to an image region of the vehicle lateral side image (right side) 103R which is shown substantially on the right side of FIG. 13.

In the vehicle lateral side image (right side) 103R shown on the left side of FIG. 13, the vehicle movement direction display line 112 is displayed while overlapping the image.

That vehicle movement direction display line 112 is a line indicating a movement direction of the vehicle, which is determined in accordance with a steering-wheel operation of the vehicle.

The image processing unit inputs steering-wheel operation information of the vehicle, calculates a movement direction of the vehicle on the basis of the input steering-wheel operation information of the vehicle, determines a drawing line in accordance with the movement direction of the vehicle, which is determined in accordance with the result of calculation, superimposes the vehicle movement direction display line 112 on the image, and outputs them.

Further, the vehicle lateral side image (right side) 103R is set to include an image of a side region of the vehicle, i.e., a vehicle lateral side image 113.

By providing the display image with the vehicle lateral side image 113 in this manner, it becomes possible to accurately grasp the distance from the vehicle to the obstacle and the size of the obstacle.

It should be noted that a setting to also provide the travel direction image (rear image) 102B shown in FIG. 13 with a vehicle bumper image 114 which is a part of the rear portion of the vehicle is employed.

By providing the display image with the vehicle bumper image 114 in this manner, it becomes possible to accurately grasp the distance from the vehicle to the obstacle and the size of the obstacle.

The image display examples described with reference to FIGS. 10 to 13 are image display examples in a case where the vehicle is backed rearward while curving the vehicle by turning the steering wheel to the right or the left.

In such a case, an image of the left side or an image of the right side is additionally displayed as an image showing a view in the movement direction of the vehicle in addition to the rear image.

However, in a case of forward travel without turning the steering wheel, the vehicle only moves in the front and rear directions and does not move in the left and right directions. Therefore, display processing of the left side image and the right side image is not performed.

Figure 14:
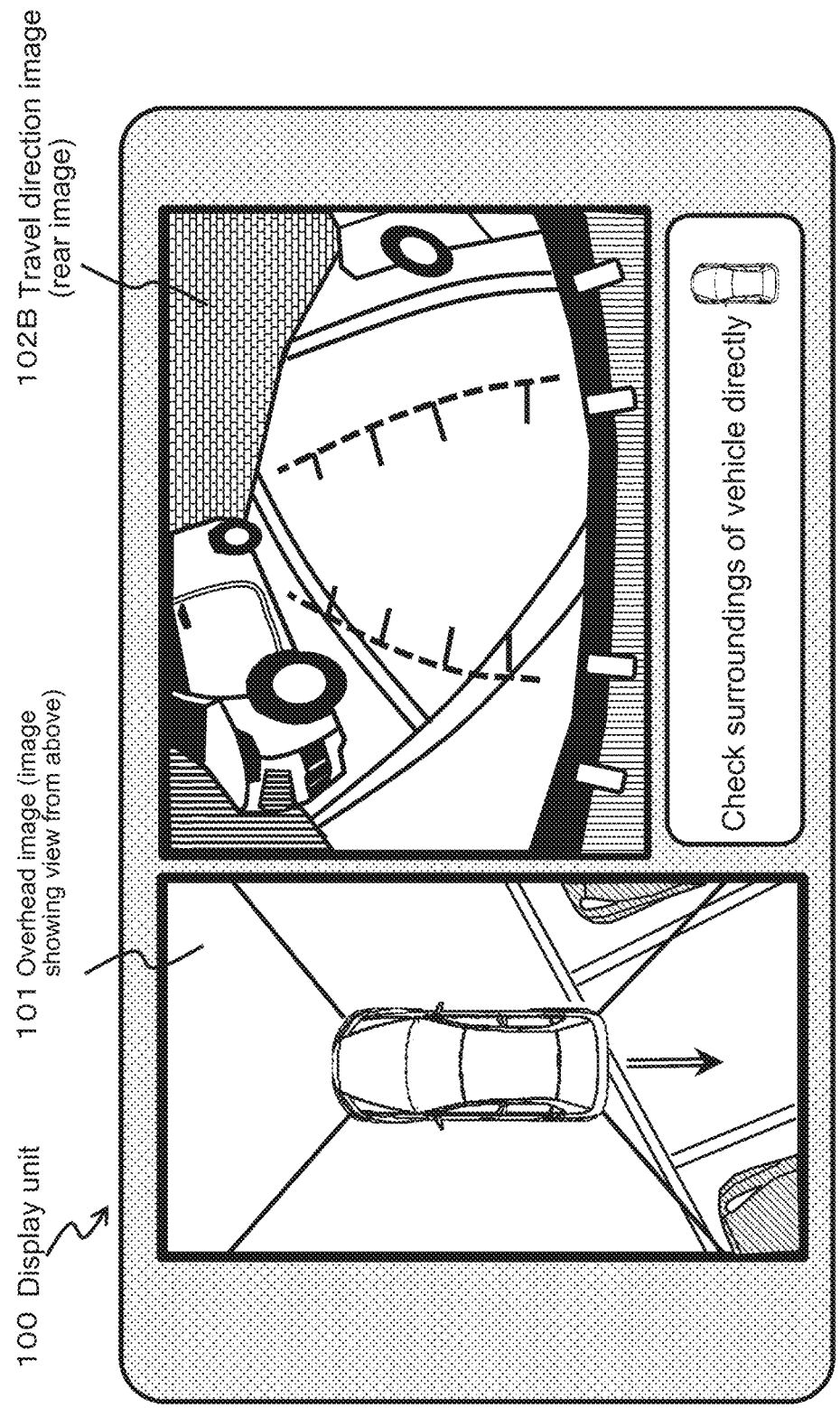
[FIG. 14] A diagram describing an example of the display image of the display unit.

FIG. 14 shows a display image example of the display unit 100 in a case where the vehicle is linearly reversed in the rear direction.

Only the overhead image 101 and the travel direction image (rear image) 102B are displayed on the display unit.

In this case, the vehicle does not move in the left and right directions, and even if an obstacle is present on the left or right sides of the vehicle, there is no possibility that the vehicle will hit or crash into the obstacle. Therefore, display processing of the side image and the right side image is not performed.

Figure 15:
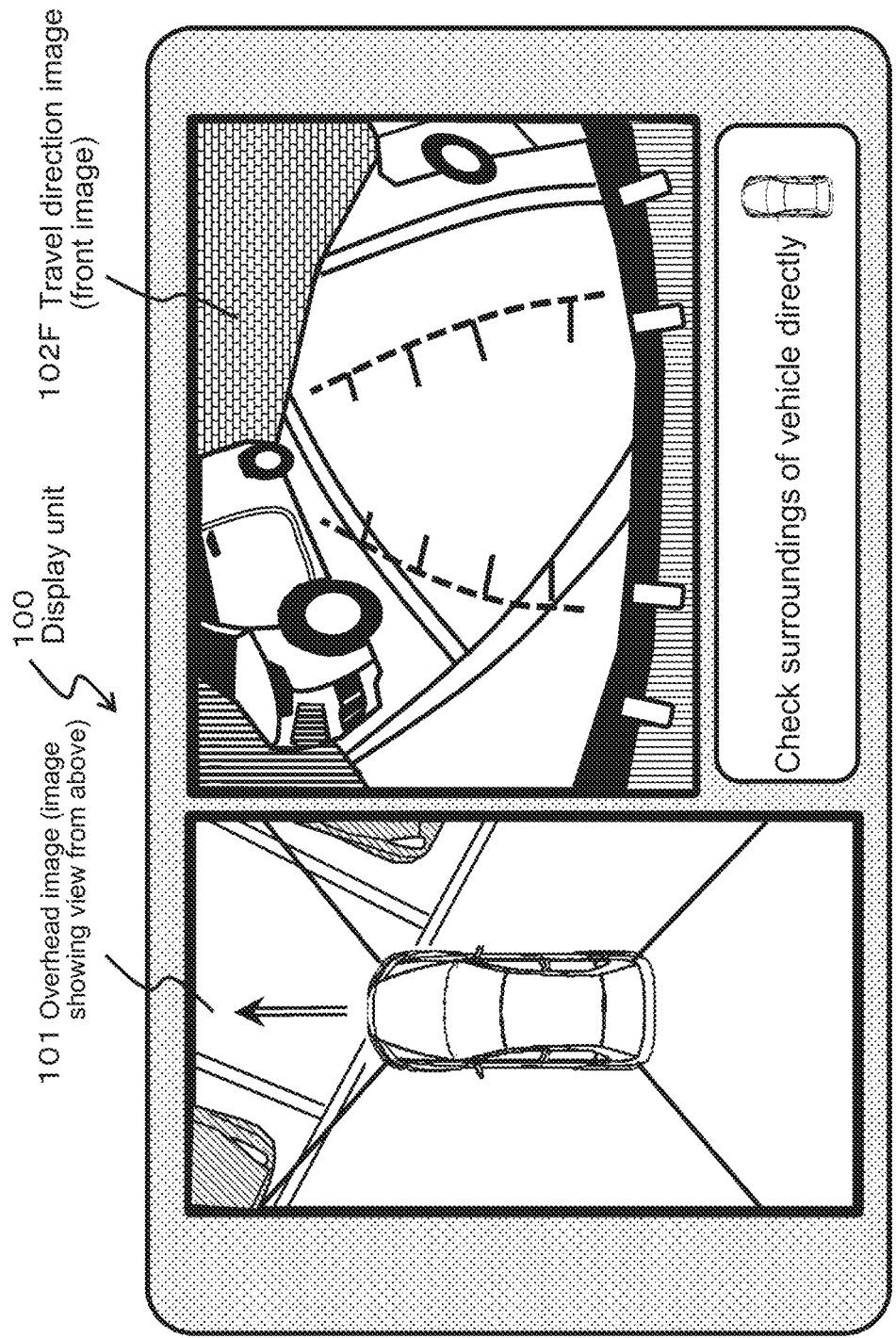
[FIG. 15] A diagram describing an example of the display image of the display unit.

FIG. 15 shows a display image example of the display unit 100 in a case where the vehicle is caused to linearly travel forward in the front direction. As shown in the overhead image 101 in the figure, the vehicle travels in a straight line while the front portion thereof faces the parking space.

In this setting, only the overhead image 101 and the travel direction image (front image) 102F are displayed on the display unit.

Also in this case, the vehicle does not move in the left and right directions, and even if an obstacle is present on the left or right sides of the vehicle, there is no possibility that the vehicle will hit or crash into the obstacle. Therefore, display processing of the side image and the right side image is not performed.

Figure 16:
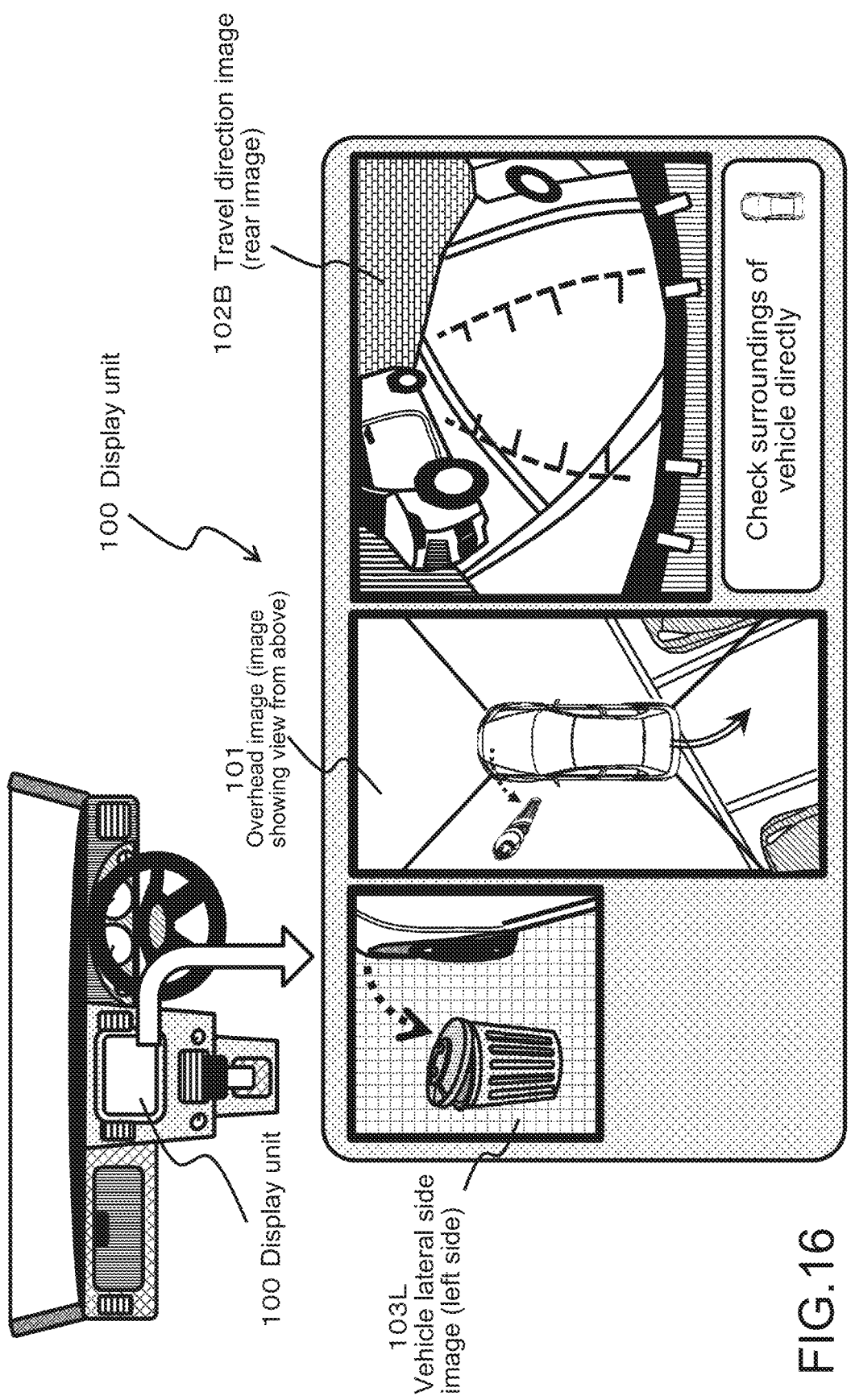
[FIG. 16] A diagram describing an example of the display image of the display unit.

FIG. 16 shows an example of a dashboard configuration in front of the driver seat of the vehicle and a display image to be displayed on the display unit 100 provided in the dashboard.

The display unit 100 is provided in a region such that the driver of the car can view it while driving.

The display example of the display unit 100 shown in FIG. 16 is the display example described above with reference to FIG. 10, and is an example in which three types of display images as follows are displayed:

(a) Overhead image 101;
(b) Travel direction image (rear image) 102B; and
(c) Vehicle lateral side image (left side image) 103L.

The image to be displayed on the display unit 100 is switched in accordance with a movement direction of the vehicle. The image processing apparatus inside the vehicle inputs vehicle information, specifically, the movement direction of the vehicle, forward travel or rearward travel, the direction of rotation of the steering wheel, the angle-of-rotation information, and the like and performs switching processing of the display image of the display unit 100 in accordance with such vehicle information.

A shift example of the display image of the display unit 100 will be described with reference to FIG. 17.

Figure 17:
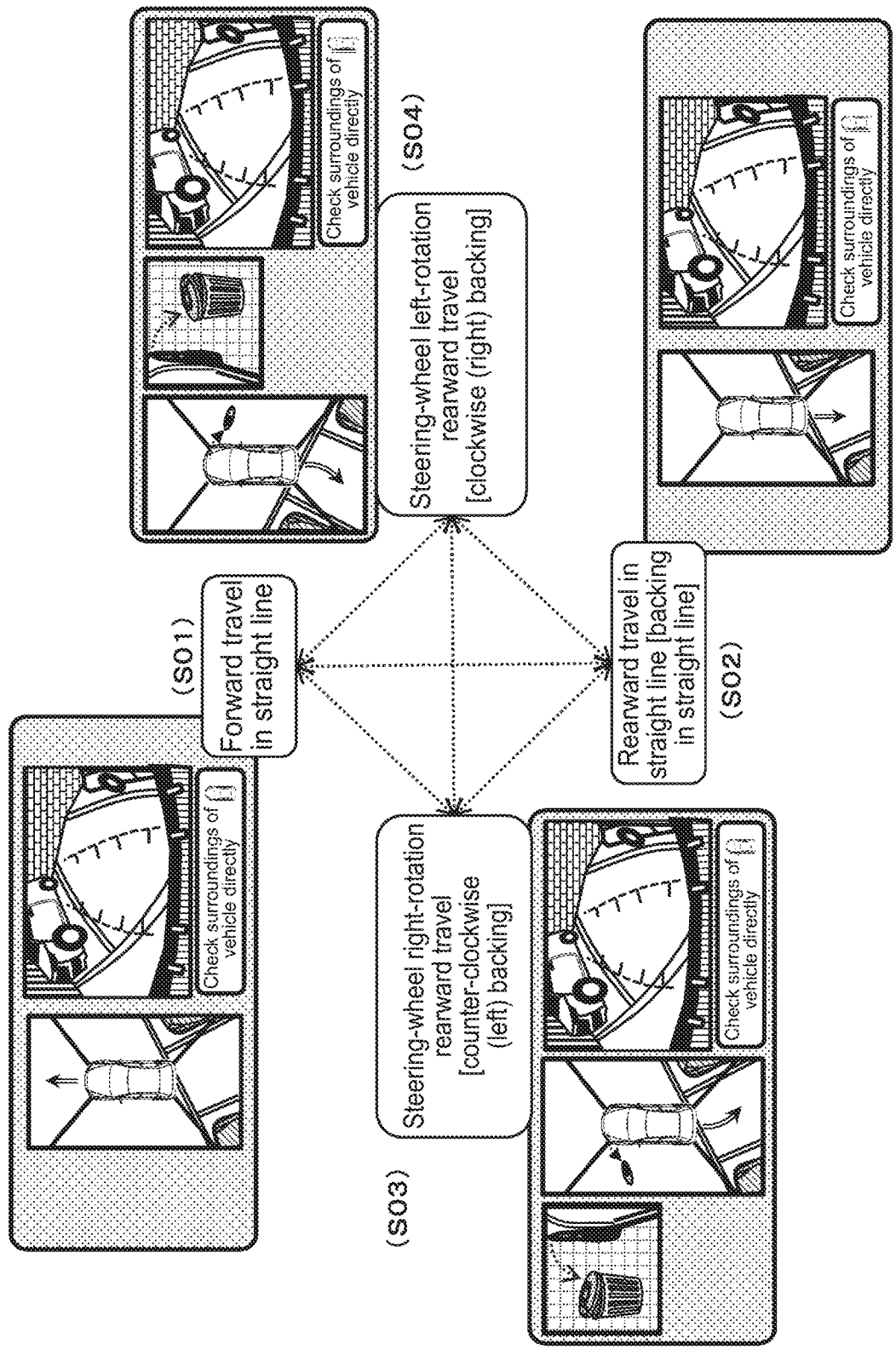
[FIG. 17] A diagram describing a shift processing example of the display image of the display unit which depends on vehicle conditions.

FIG. 17 shows a display image example of the display unit in the following four kinds of vehicle states:

(S01) Forward travel in straight line;
(S02) Rearward travel in straight line (backing in straight line);
(S03) Steering-wheel right-rotation rearward travel (counter-clockwise (left) backing); and
(S04) Steering-wheel left-rotation rearward travel (clockwise (right) backing).

In the case of (S01) Forward travel in straight line, only the overhead image 101 and the travel direction image (front image) 102F are displayed on the display unit as described above with reference to FIG. 15.

In this case, the vehicle does not move in the left and right directions, and even if an obstacle is present on the left or right sides of the vehicle, there is no possibility that the vehicle will hit or crash into the obstacle. Therefore, display processing of the side image and the right side image is not performed.

Also in the case of (S02) Rearward travel in straight line (backing in straight line), only the overhead image 101 and the travel direction image (rear image) 102B are displayed on the display unit as described above with reference to FIG. 14.

Also in this case, the vehicle does not move in the left and right directions, and even if an obstacle is present on the left or right sides of the vehicle, there is no possibility that the vehicle will hit or crash into the obstacle. Therefore, display processing of the side image and the right side image is not performed.

In the case of (S03) Steering-wheel right-rotation rearward travel (counter-clockwise (left) backing), the three images, the overhead image 101, the travel direction image (rear image) 102B, and the vehicle lateral side image (left side image) 103L, are displayed on the display unit as described above with reference to FIG. 10.

In this case, the vehicle front portion moves in the left direction. The vehicle lateral side image (left side image) 103L is an image showing a view in that movement direction. That image is displayed in the front left region of the overhead image 101. It is an image layout for causing the driver who views the display unit 100 to intuitively grasp that the vehicle lateral side image (left side image) 103L is the image of the front left side of the vehicle.

It should be noted that the vehicle lateral side image (left side image) 103L includes the left side image of the vehicle itself and a vehicle movement direction display line indicating the movement direction of the vehicle is further displayed.

In the case of (S04) Steering-wheel left-rotation rearward travel (clockwise (right) backing), the three images, the overhead image 101, the travel direction image (rear image) 102B, and the vehicle lateral side image (right side image) 103R, are displayed on the display unit as described above with reference to FIG. 12.

In this case, the vehicle front portion moves in the right direction. The vehicle lateral side image (right side image) 103R is an image showing a view in that movement direction. That image is displayed in the front right region of the overhead image 101. It is an image layout for causing the driver who views the display unit 100 to intuitively grasp that the vehicle lateral side image (right side image) 103R is the image of the front right side of the vehicle.

It should be noted that the vehicle lateral side image (right side image) 103R includes the right side image of the vehicle itself and a vehicle movement direction display line indicating the movement direction of the vehicle is further displayed.

The four image display examples shown in FIG. 17 are display examples of representative images depending on the vehicle states.

For example, the overhead image, the travel direction image (rear image), and the vehicle lateral side image (left/right side image) are displayed in the following vehicle states shown in FIG. 17, i.e., (S03) Steering-wheel right-rotation rearward travel (counter-clockwise (left) backing), and
(S04) Steering-wheel left-rotation rearward travel (clockwise (right) backing). Those images are changed in a manner that depends on the angle of rotation of the steering wheel.

Further, the guide lines indicating the travel direction or movement direction of the car, which are shown in the respective images, are also sequentially updated in a manner that depends on the angle of rotation of the steering wheel.

The image processing apparatus inside the car sequentially inputs vehicle information such as an angle of rotation of the steering wheel and car speed information, calculates a travel direction or movement direction of the car on the basis of such input information, and performs drawing processing or updating processing of the guide line shown in each image.

[4. Regarding Other Image Display Examples on Display Unit]

Next, other image display examples for the display unit will be described.

[4-1. Other Image Display Example 1]

In the example described above with reference to FIG. 17, described is the example of displaying, in the case of backing by turning the steering wheel to either the left or the right, i.e., in any of the following settings shown in FIG. 17:

(S03) Steering-wheel right-rotation rearward travel (counter-clockwise (left) backing); and
(S04) Steering-wheel left-rotation rearward travel (clockwise (right) backing),
the following three types of images:
(a) Overhead image;
(b) Travel direction image (rear image); and
(c) Vehicle lateral side image (left/right side image).

However, it is not essential to display those three types of images on the display unit. There may be employed a configuration in which any of those three types of images or any two combined images of them are displayed.

FIGS. 18A and 18B are examples of displaying, in the following settings:

(S03) Steering-wheel right-rotation rearward travel (counter-clockwise (left) backing); and
(S04) Steering-wheel left-rotation rearward travel (clockwise (right) backing),
not (a) Overhead image,
but only the following two kinds of images:
(b) Travel direction image (rear image); and
(c) Vehicle lateral side image (left/right side image).

FIG. 18A is an example of a display image in "Steering-wheel right-rotation rearward travel (counter-clockwise (left) backing)".

On the display unit, the vehicle lateral side image (left side image) is displayed at a position on the left side of the display unit, which corresponds to the vehicle's forward movement direction, and the travel direction image (rear image) is displayed on the right side.

FIG. 18B is an example of a display image in "Steering-wheel left-rotation rearward travel (clockwise (right) backing)".

On the display unit, the vehicle lateral side image (right side image) is displayed at a position on the right side of the display unit, which corresponds to the vehicle's forward movement direction, and the travel direction image (rear image) is displayed on the left side.

The setting to omit display of the overhead image and display only the travel direction image (rear image) and the vehicle lateral side image (left/right side image) as described above and a setting to display a combination of other images or only one image are also possible.

[4-2. Other Image Display Example 2]

The display unit 100 applied to the above-mentioned image display examples is set to be horizontally long.

The display unit installed in the vehicle is not limited to the setting to be horizontally long and may be set to be vertically long.

Figure 19:
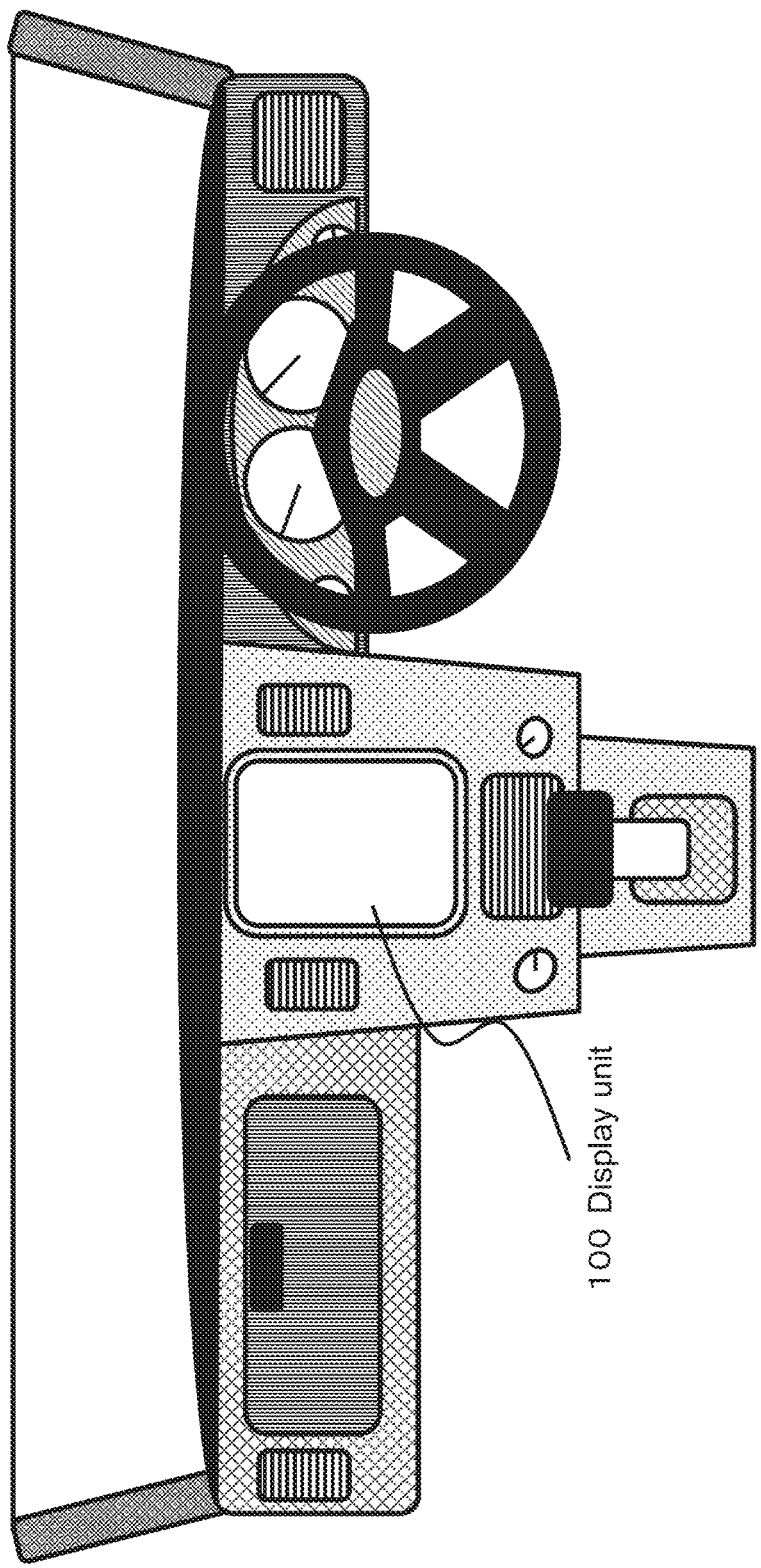
[FIG. 19] A diagram describing a setting example of the display unit.

For example, as shown in FIG. 19, the vertically long display unit 100 is provided at a position of the dashboard of the car such that the driver can check it.

Figures 20A, 20B:
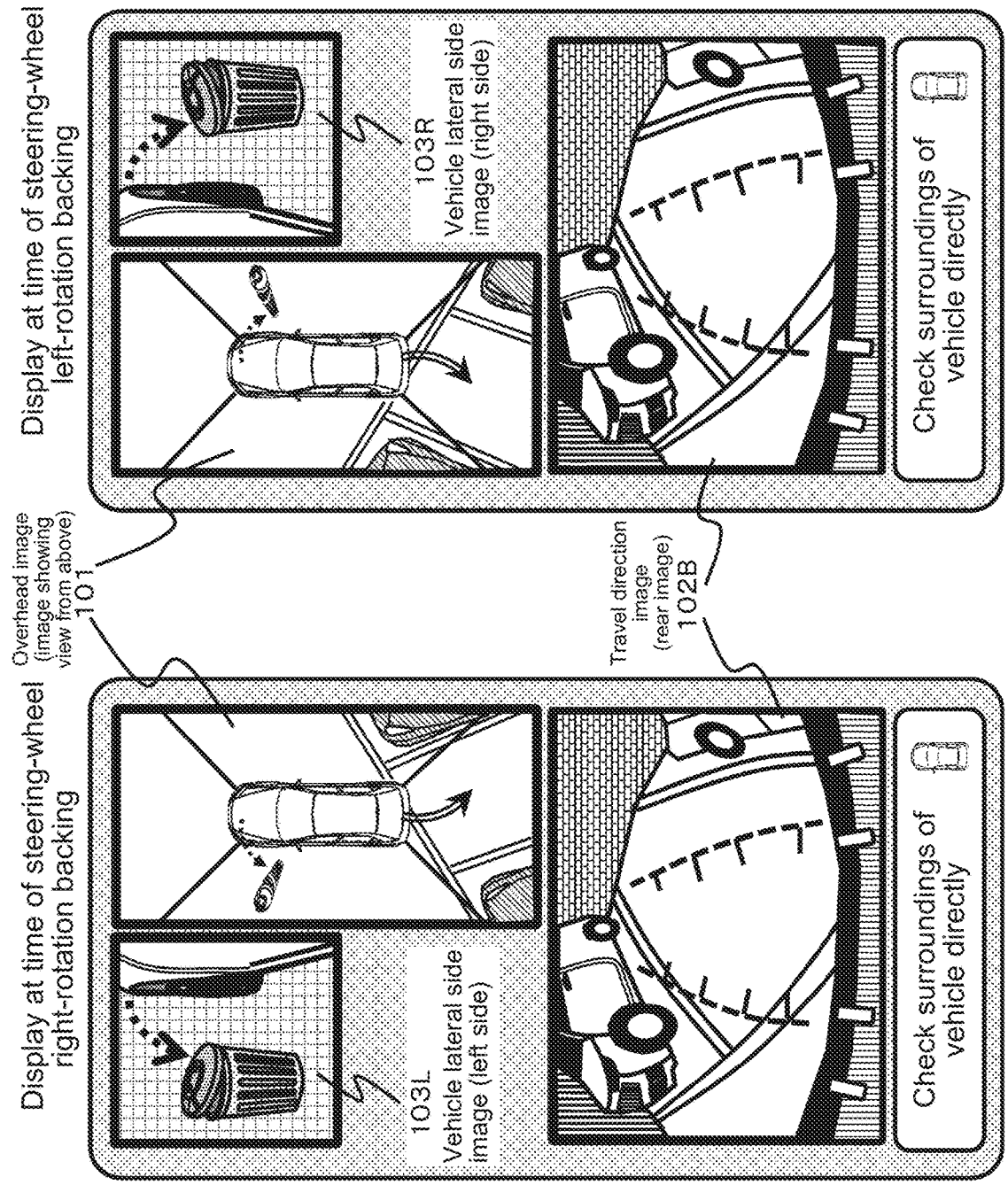
[FIGS. 20A and 20B] Diagrams describing an example of the display image of the display unit.

An image display example on the vertically long display unit 100 shown in FIG. 19 is shown in FIGS. 20A and 20B.

FIGS. 20A and 20B show a display example in the following two vehicle states as the image display example on the vertically long display unit 100:

(FIG. 20A) Steering-wheel right-rotation rearward travel (counter-clockwise (left) backing); and (FIG. 20B) Steering-wheel left-rotation rearward travel (clockwise (right) backing).

(FIG. 20A) Steering-wheel right-rotation rearward travel (counter-clockwise (left) backing)

In the case of that vehicle state, the three images, the overhead image 101, the travel direction image (rear image) 102B, and the vehicle lateral side image (left side image) 103L, are displayed on the display unit 100 as shown in FIG. 20A.

The overhead image 101 and the vehicle lateral side image (left side image) 103L are displayed in an upper region of the display unit and the travel direction image (rear image) 102B is displayed in a lower region.

The vehicle lateral side image (left side image) 103L is displayed in the front left region of the overhead image 101. That display image layout is an image layout for causing the driver who views the display unit 100 to intuitively grasp that the vehicle lateral side image (left side image) 103L is the image of the front left side of the vehicle.

It should be noted that the vehicle lateral side image (left side image) 103L includes the left side image of the vehicle itself and a vehicle movement direction display line indicating the movement direction of the vehicle is further displayed.

(FIG. 20B) Steering-wheel left-rotation rearward travel (clockwise (right) backing)

In the case of that vehicle state, the three images, the overhead image 101, the travel direction image (rear image) 102B, and the vehicle lateral side image (right side image) 103R, are displayed on the display unit 100 as shown in FIG. 20B.

The overhead image 101 and the vehicle lateral side image (right side image) 103R are displayed in the upper region of the display unit and the travel direction image (rear image) 102B is displayed in the lower region.

The vehicle lateral side image (right side image) 103R is displayed in the front right region of the overhead image 101. That display image layout is an image layout for causing the driver who views the display unit 100 to intuitively grasp that the vehicle lateral side image (left side image) 103L is the image of the front left side of the vehicle.

It should be noted that the vehicle lateral side image (right side image) 103R includes the left side image of the vehicle itself and a vehicle movement direction display line indicating the movement direction of the vehicle is further displayed.

Figures 21A, 21B:
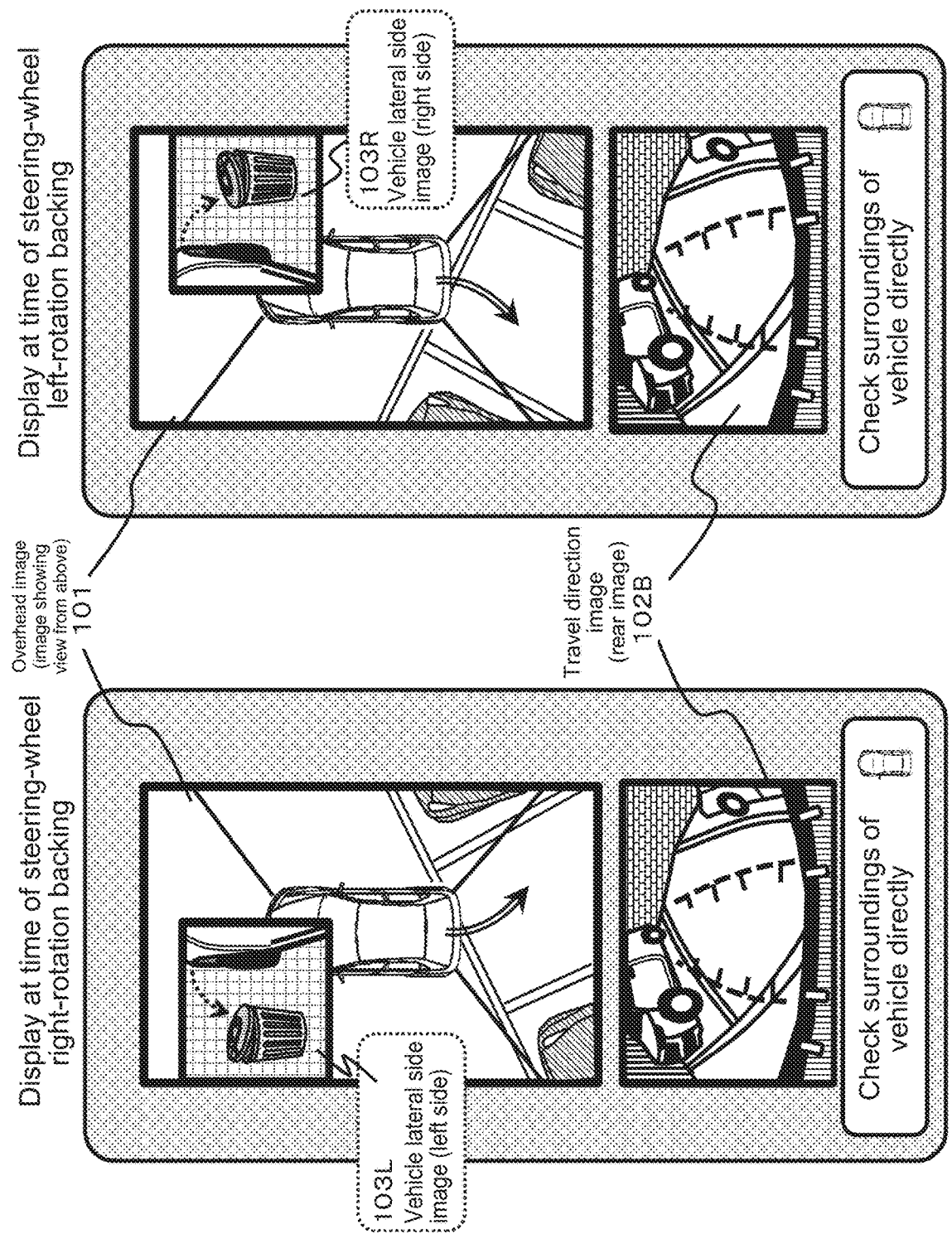
[FIGS. 21A and 21B] Diagrams describing an example of the display image of the display unit.

FIGS. 21A and 21 B are another display examples on the vertically long display unit 100 and are diagrams showing an image display example different from that of FIGS. 20B and 20B.

As in FIGS. 20A and 20B, FIGS. 21A and 21B show display examples in the following two vehicle states:

(FIG. 21A) Steering-wheel right-rotation rearward travel (counter-clockwise (left) backing); and (FIG. 21 B) Steering-wheel left-rotation rearward travel (clockwise (right) backing).

FIG. 21A Steering-wheel right-rotation rearward travel (counter-clockwise (left) backing)

In the case of that vehicle state, as shown in of FIG. 21A, the three images, the overhead image 101, the travel direction image (rear image) 102B, and the vehicle lateral side image (left side image) 103L, are displayed on the display unit 100.

The overhead image 101 is displayed in the upper region of the display unit and the vehicle lateral side image (left side image) 103L is displayed overlapping in a front left region of a vehicle region of the overhead image 101. The travel direction image (rear image) 102B is displayed in the lower region.

The example shown in FIGS. 21A and 21B are examples of superimposing and displaying the vehicle lateral side image (left side image) 103L on the vehicle region of the overhead image 101.

With this display image, the driver can more surely check whether or not there is an obstacle in the movement direction of the vehicle.

This example superimposes and displays the vehicle lateral side image (left side image) 103L on a front left portion of the vehicle region of the overhead image 101 and is an image which makes it possible to inform the driver of the fact that it is necessary to pay attention to that position.

FIG. 21 B Steering-wheel left-rotation rearward travel (clockwise (right) backing)

In the case of that vehicle state, the three images, the overhead image 101, the travel direction image (rear image) 102B, and the vehicle lateral side image (right side image) 103R, are displayed on the display unit 100 as shown in FIG. 21B.

The overhead image 101 is displayed in the upper region of the display unit and the vehicle lateral side image (right side image) 103R is displayed overlapping in a front right region of the vehicle region of the overhead image 101. The travel direction image (rear image) 102B is displayed in the lower region.

The example shown in (2) of FIG. 21B superimposes and displays the vehicle lateral side image (right side image) 103R on a front right portion of the vehicle region of the overhead image 101 and is an image which makes it possible to inform the driver of the fact that it is necessary to pay attention to that position.

[5. Regarding Other Embodiments]

Next, a modified example of the above-mentioned embodiment will be described.

In the above-mentioned embodiment, a switching shift of the display mode described with reference to FIG. 17 is configured to be performed by detecting vehicle information such as a state in the travel direction of the vehicle due to a reverse gear, a travel direction determination state, and a direction of the steering, for example, and utilizing that detected information.

Such display mode switching may be configured to perform cyclic switching according to an operator's button operation, switching according to an operation for an arrangement position desired to be displayed on the overhead image through a touch panel, and switching of the display mode according to a direction indication operation and the like through a gesture.

Further, the configuration example of displaying, on the display unit, the vehicle front lateral side image along with the image showing a view in the vehicle travel direction (in the rear of the vehicle) at the time of backing of the vehicle has been described in the embodiment above. However, the configuration of displaying the vehicle rear lateral side image is favorably employed also when the vehicle travels forward.

By performing such display processing, it is possible to cause the driver to check an obstacle in the left or right directions behind the vehicle in the case of traveling in the front direction by turning the steering wheel.

An example of the display image of the display unit 100 in a case of causing the vehicle to travel forward while curving the vehicle by turning the steering wheel when the vehicle travels forward will be described with reference to FIGS. 22 and 23.

Figure 22:
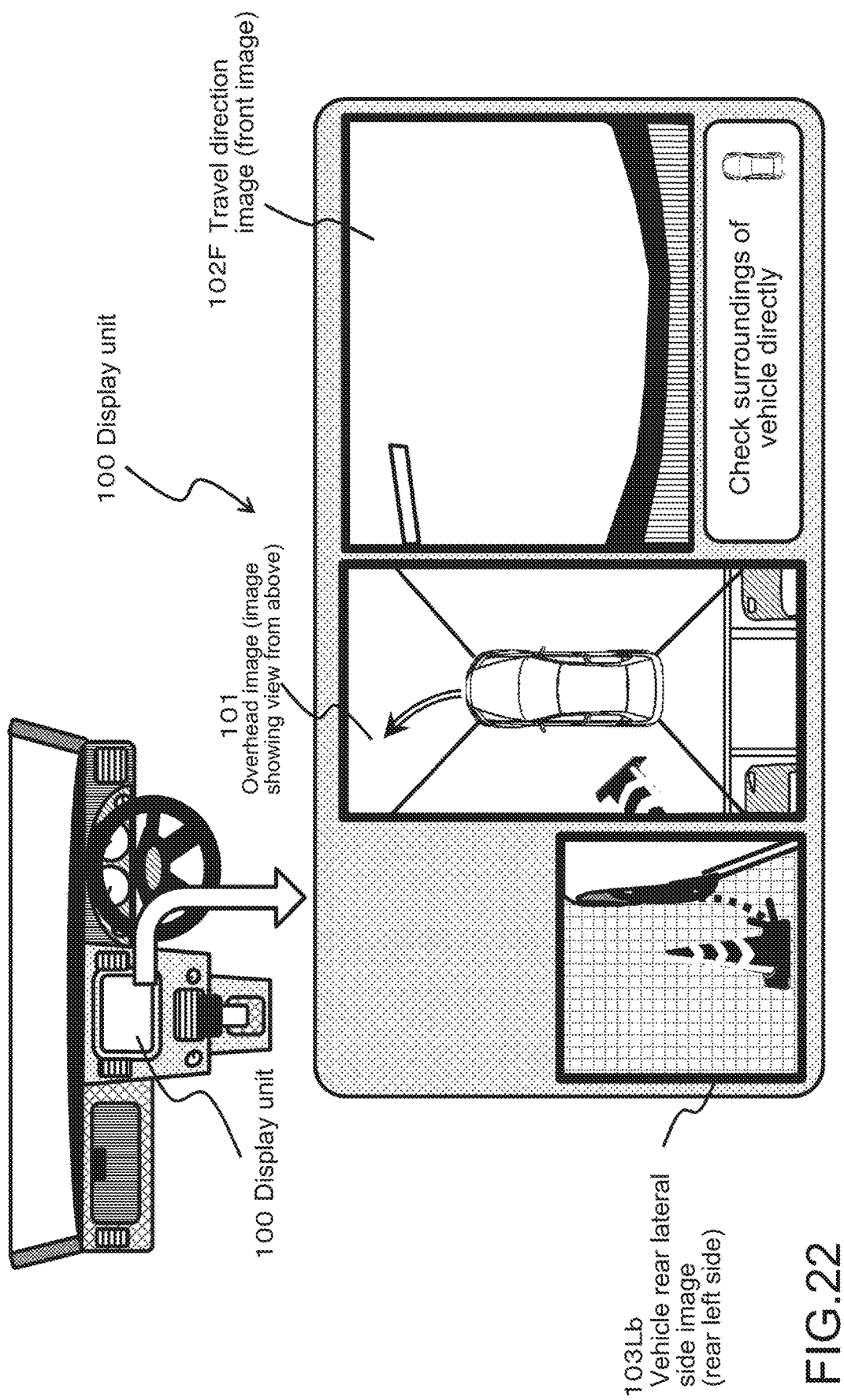
FIG. 22 A diagram describing an example of the display image of the display unit.

FIG. 22 shows an example of the display image of the display unit 100 in a case where causing the vehicle to travel forward and counter-clockwise (leftward) by turning the steering wheel of the vehicle to the left.

As shown in FIG. 22, the display image of the display unit 100 includes the following three types of images:
(a) Overhead image 101;
(b) Travel direction image (front image) 102F; and
(c) Vehicle rear lateral side image (rear left side image) 103Lb.

In the example shown in FIG. 22, an obstacle image (object image) is displayed on a rear left side of the vehicle as shown in the overhead image 101.

However, there is a possibility that even when the driver views that obstacle image (object image), the driver cannot recognize the shape and the height thereof and judges that there is no crash possibility of the vehicle.

(C) Vehicle rear lateral side image (rear left side image) 103Lb shown in FIG. 22 is an image of the rear left side of the vehicle.

In a case where the vehicle causes the vehicle to travel forward and counter-clockwise (leftward) by turning the steering wheel to the left, the tracks of the rear wheels are drawn inside the tracks of the corresponding front wheels. That is, the vehicle rear portion is rotated while passing inside the vehicle front portion. As a result, there is a possibility that the left surface of the vehicle hits or crashes into the obstacle at the vehicle rear portion, which it does not hit at the vehicle front portion.

That is, a difference between the track of the vehicle front portion and the track of the rear portion due to a difference between tracks followed by front and back inner wheels when turning (inner wheel difference) is generated.

The vehicle rear lateral side image (rear left side image) 103Lb shown in FIG. 22 is an image showing a view at a position at which there is a hit possibility due to that inner wheel difference, i.e., an image showing a direction in which the vehicle is to move. That image is displayed on the display unit.

The vehicle rear lateral side image (rear left side image) 103Lb shown in FIG. 22 includes the left side image of the vehicle itself and a vehicle movement direction display line indicating the movement direction of the vehicle is further displayed.

By viewing the vehicle rear lateral side image (rear left side image) 103Lb shown in FIG. 22 and the vehicle movement direction display line, the driver can accurately grasp what is an obstacle present in the movement direction of the vehicle and a height thereof and a distance from the vehicle and correctly make a judgement about the crash possibility of the vehicle.

In the vehicle rear lateral side image (rear left side image) 103Lb shown in FIG. 22, the obstacle image (object image) is clearly displayed. The driver can surely recognize that the obstacle which the vehicle can hit or crash into is present on the vehicle left side.

Consequently, the driver can stop causing the vehicle to travel, perform an operation on the steering wheel and the like, change the vehicle travel direction to avoid the obstacle, and cause the vehicle to safely travel.

It should be noted that in the layout of the three images of the display unit 100 shown in FIG. 22, a setting to display the vehicle rear lateral side image (rear left side image) 103Lb in a rear left region of the overhead image 101 is employed.

It is an image layout for causing the driver who views the display unit 100 to intuitively grasp that the vehicle rear lateral side image (rear left side image) 103Lb is the image of the rear left side of the vehicle.

Figure 23:
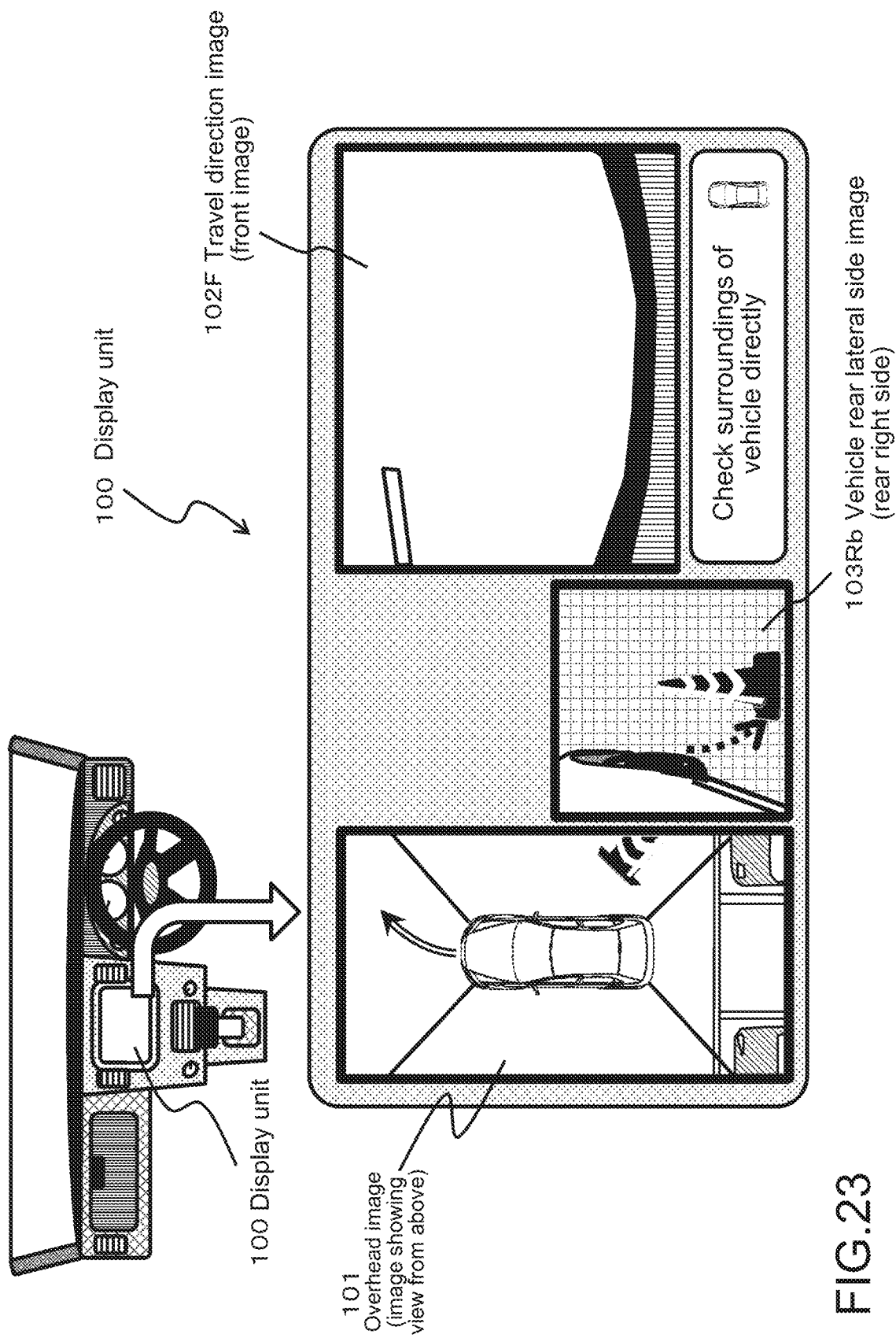
FIG. 23 A diagram describing an example of the display image of the display unit.

FIG. 23 shows an example of the display image of the display unit 100 in a case of causing the vehicle to travel forward and clockwise (rightward) by turning the steering wheel of the vehicle to the right.

As shown in FIG. 23, the display image of the display unit 100 includes the following three types of images:
(a) Overhead image 101;
(b) Travel direction image (front image) 102F; and
(c) Vehicle rear lateral side image (rear right side image) 103Rb.

In the example shown in FIG. 23, an obstacle image (object image) is displayed on a rear right side of the vehicle as shown in the overhead image 101.

However, there is a possibility that even when the driver views that obstacle image (object image), the driver cannot recognize the shape and the height thereof and judges that there is no crash possibility of the vehicle.

(C) Vehicle rear lateral side image (rear right side image) 103Rb shown in FIG. 23 is an image of the rear right side of the vehicle.

In a case where the vehicle causes the vehicle to travel forward and clockwise (rightward) by turning the steering wheel to the right, the tracks of the rear wheels are drawn inside the tracks of the corresponding front wheels. That is, the vehicle rear portion is rotated while passing inside the vehicle front portion. As a result, there is a possibility that the right surface of the vehicle hits or crashes into the obstacle at the vehicle rear portion, which it does not hit at the vehicle front portion.

That is, a difference between the track of the vehicle front portion and the track of the rear portion due to the inner wheel difference is generated.

The vehicle rear lateral side image (rear right side image) 103Rb shown in FIG. 23 is an image showing a view at a position at which there is a hit possibility due to that inner wheel difference, i.e., an image showing a direction in which the vehicle is to move. That image is displayed on the display unit.

The vehicle rear lateral side image (rear right side image) 103Rb shown in FIG. 23 includes the right side image of the vehicle itself and a vehicle movement direction display line indicating the movement direction of the vehicle is further displayed.

By viewing the vehicle rear lateral side image (rear right side image) 103Rb shown in FIG. 23 and the vehicle movement direction display line, the driver can accurately grasp what is an obstacle present in the movement direction of the vehicle and a height thereof and a distance from the vehicle and correctly make a judgement about the crash possibility of the vehicle.

In the vehicle rear lateral side image (rear right side image) 103Rb shown in FIG. 23, the obstacle image (object image) is clearly displayed. The driver can surely recognize that the obstacle which the vehicle can hit or crash into is present on the vehicle right side.

Consequently, the driver can stop causing the vehicle to travel, perform an operation on the steering wheel and the like, change the vehicle travel direction to avoid the obstacle, and cause the vehicle to safely travel.

It should be noted that in the layout of the three images of the display unit 100 shown in FIG. 23, a setting to display the vehicle rear lateral side image (rear right side image) 103Rb in a rear right region of the overhead image 101 is employed.

It is an image layout for causing the driver who views the display unit 100 to intuitively grasp that the vehicle rear lateral side image (rear right side image) 103Lb is the image of the rear right side of the vehicle.

The image displayed on the display unit 100 is switched in accordance with a movement direction of the vehicle. The image processing apparatus inside the vehicle inputs vehicle information, specifically, the movement direction of the vehicle, forward travel or rearward travel, the direction of rotation of the steering wheel, the angle-of-rotation information, and the like and performs switching processing of the display image of the display unit 100 in accordance with such vehicle information.

A shift example of the display image of the display unit 100 will be described with reference to FIG. 24.

Figure 24:
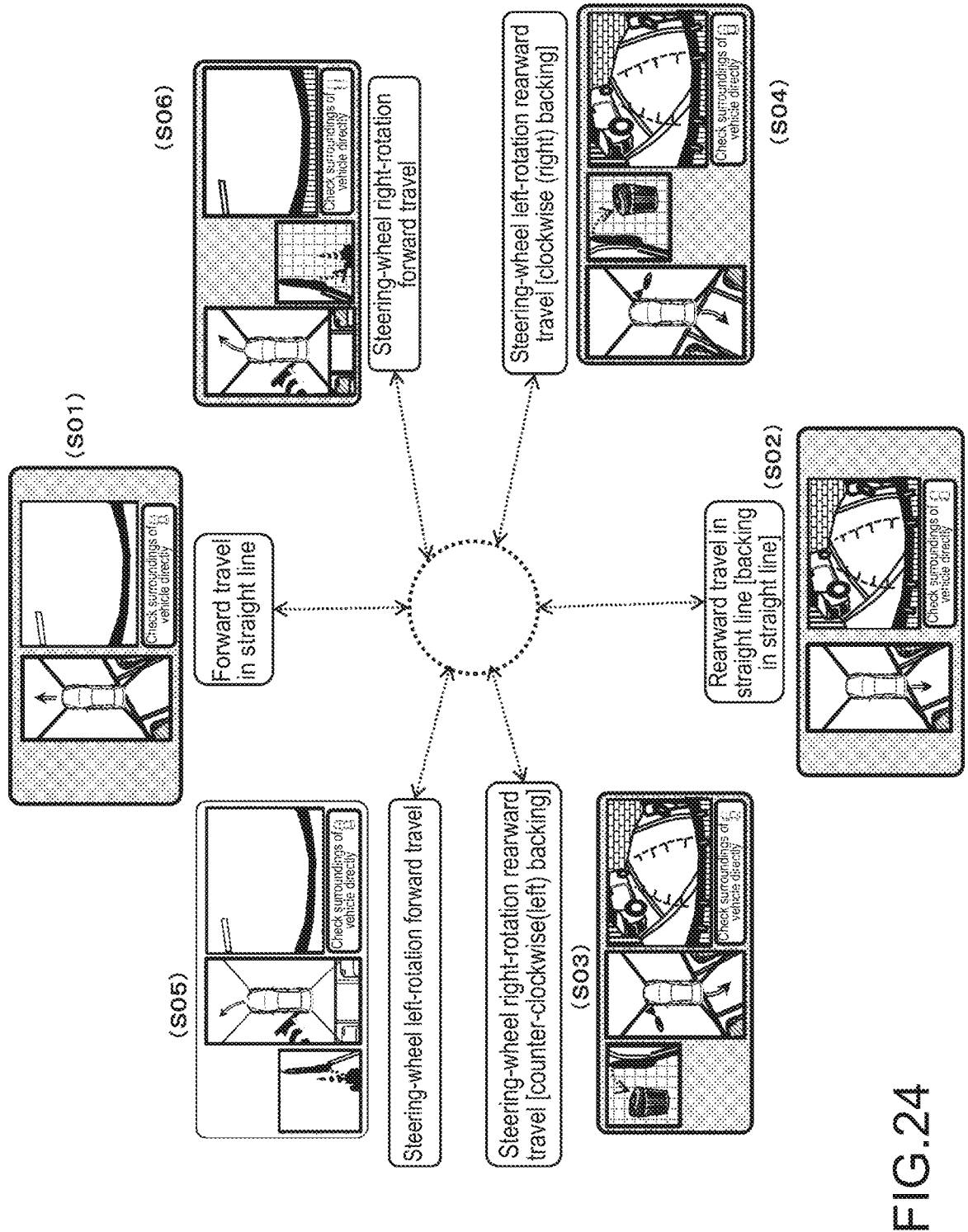
FIG. 24 A diagram describing a shift processing example of the display image of the display unit which depends on the vehicle conditions.

FIG. 24 shows a display image example of the display unit in the following six kinds of vehicle states:
(S01) Forward travel in straight line;
(S02) Rearward travel in straight line (backing in straight line);
(S03) Steering-wheel right-rotation rearward travel (counter-clockwise (left) backing);
(S04) Steering-wheel left-rotation rearward travel (clockwise (right) backing);
(S05) Steering-wheel left-rotation forward travel (counter-clockwise forward travel); and
(S06) Steering-wheel right-rotation forward travel (counter-clockwise forward travel).

In the case of (S01) Forward travel in straight line, only the overhead image and the travel direction image (front image) are displayed on the display unit.

In this case, the vehicle does not move in the left and right directions, and even if an obstacle is present on the left or right sides of the vehicle, there is no possibility that the vehicle will hit or crash into the obstacle. Therefore, display processing of the side image and the right side image is not performed.

Also in the case of (S02) Rearward travel in straight line (backing in straight line), only the overhead image and the travel direction image (rear image) are displayed on the display unit.

Also in this case, the vehicle does not move in the left and right directions, and even if an obstacle is present on the left or right sides of the vehicle, there is no possibility that the vehicle will hit or crash into the obstacle. Therefore, display processing of the side image and the right side image is not performed.

In the case of (S03) Steering-wheel right-rotation rearward travel (counter-clockwise (left) backing), the three images, the overhead image, the travel direction image (rear image), and the vehicle lateral side image (left side image), are displayed on the display unit.

In this case, the vehicle front portion moves in the left direction. The vehicle lateral side image (left side image) is an image showing a view in that movement direction. That image is displayed in the front left region of the overhead image. It is an image layout for causing the driver who views the display unit 100 to intuitively grasp that the vehicle lateral side image (left side image) is the image of the front left side of the vehicle.

It should be noted that the vehicle lateral side image (left side image) includes the left side image of the vehicle itself and a vehicle movement direction display line indicating the movement direction of the vehicle is further displayed.

In the case of (S04) Steering-wheel left-rotation rearward travel (clockwise (right) backing), the three images, the overhead image, the travel direction image (rear image), and the vehicle lateral side image (right side image), are displayed on the display unit.

In this case, the vehicle front portion moves in the right direction. The vehicle lateral side image (right side image) is an image showing a view in that movement direction. That image is displayed in the front right region of the overhead image. It is an image layout for causing the driver who views the display unit 100 to intuitively grasp that the vehicle lateral side image (right side image) is the image of the front right side of the vehicle.

It should be noted that the vehicle lateral side image (right side image) includes the right side image of the vehicle itself and a vehicle movement direction display line indicating the movement direction of the vehicle is further displayed.

In the case of (S05) Steering-wheel left-rotation forward travel (counter-clockwise forward travel), the three images, the overhead image, the travel direction image (front image), and the vehicle lateral side image (left side image), are displayed on the display unit.

In this case, the vehicle rear portion moves in the left direction. The vehicle lateral side image (left side image) is an image showing a view in that movement direction. That image is displayed in a rear left region of the overhead image. It is an image layout for causing the driver who views the display unit 100 to intuitively grasp that the vehicle lateral side image (left side image) is the image of the rear left side of the vehicle.

It should be noted that the vehicle lateral side image (left side image) includes the left side image of the vehicle itself and a vehicle movement direction display line indicating the movement direction of the vehicle is further displayed.

In the case of (S06) Steering-wheel right-rotation forward travel (clockwise forward travel), the three images, the overhead image, the travel direction image (front image), and the vehicle lateral side image (right side image), are displayed on the display unit.

In this case, the vehicle rear portion moves in the right direction. The vehicle lateral side image (right side image) is an image showing a view in that movement direction. That image is displayed in the rear right region of the overhead image. It is an image layout for causing the driver who views the display unit 100 to intuitively grasp that the vehicle lateral side image (right side image) is the image of the rear right side of the vehicle.

It should be noted that the vehicle lateral side image (right side image) includes the right side image of the vehicle itself and a vehicle movement direction display line indicating the movement direction of the vehicle is further displayed.

The six image display examples shown in FIG. 24 are display examples of representative images depending on the vehicle states.

For example, the overhead image, the travel direction image (rear/front image), and the vehicle lateral side image (left/right side image) are displayed in the following vehicle states shown in FIG. 24, i.e., (S03) Steering-wheel right-rotation rearward travel (counter-clockwise (left) backing), (S04) Steering-wheel left-rotation rearward travel (clockwise (right) backing), (S05) Steering-wheel left-rotation forward travel (counter-clockwise forward travel), and (S06) Steering-wheel right-rotation forward travel (counter-clockwise forward travel). Those images are changed in a manner that depends on the angle of rotation of the steering wheel.

Further, the guide lines indicating the travel direction or movement direction of the car, which are shown in the respective images, are also sequentially updated in a manner that depends on the angle of rotation of the steering wheel.

The image processing apparatus inside the car sequentially inputs vehicle information such as an angle of rotation of the steering wheel and car speed information, calculates a travel direction or movement direction of the car on the basis of such input information, and performs drawing processing or updating processing of the guide line shown in each image.

It should be noted that the following setting may be made in the case where the vehicle is rotated while traveling forward as in (S05) or (S06) shown in FIG. 24. In this setting, regarding the vehicle lateral side image (left/right side image), a horizontally-rearward and downward image of the vicinity of the rear wheels is displayed during low-speed travel or until a certain time elapses from the start of departure, and an image corresponding to a camera monitoring system mode (CMS), that is, having a legal display range of a viewing angle of the rear-view mirror during travel at a high speed above a certain speed or after a certain time elapses from the start of departure.

A table listing up the image display modes of (S1) to (S6) described with reference to FIG. 24 is shown in FIG. 25.

As shown in FIG. 25,

In the case of (S01) Forward travel in straight line, the overhead image and the travel direction image (front image) are displayed.

In the case of (S02) Rearward travel in straight line (backing in straight line), the overhead image and the travel direction image (rear image) are displayed.

In the case of (S03) Steering-wheel right-rotation rearward travel (counter-clockwise (left) backing), the overhead image, the travel direction image (rear image), and the vehicle lateral side image (front left side image) are displayed.

In the case of (S04) Steering-wheel left-rotation rearward travel (clockwise (right) backing), the overhead image, the travel direction image (rear image), and the vehicle lateral side image (front right side image) are displayed.

In the case of (S05) Steering-wheel left-rotation forward travel (counter-clockwise forward travel), the overhead image, the travel direction image (front image), and the vehicle lateral side image (rear left side image) are displayed.

In the case of (S06) Steering-wheel right-rotation forward travel (counter-clockwise forward travel), the overhead image, the travel direction image (front image), and the vehicle lateral side image (rear right side image) are displayed.

It should be noted that as shown in the field "Display mode of lateral side image" in FIG. 25, in a case where the vehicle travels forward, the lateral side image is displayed by using a range within which there is an involving hit risk due to the inner wheel difference as a rearward image of the semi-central projection.

Further, in a case where the vehicle travels rearward (is backed), the lateral side image is displayed by using a range within which there is an involving hit risk due to the outer wheel difference as a rearward image of the semi-central projection.

It should be noted that an image cut out from the image photographed by the wide-angle camera may be used as the lateral side image and it is favorable that it is converted into an image of a central projection method having less distortion like the one directly observed by eyes and is displayed.

[0] Further, the example in which the display position of the vehicle lateral side image is set to be arranged on the left- and right sides of the overhead image has been described in the embodiment above. However, various settings can be made for the display position of the image.

For example, although detailed arrangement of the screen on the vehicle lateral side may be uniquely determined by the image processing unit, the operator may be enabled to finely adjust such arrangement while the position of a sub-screen which is optimal for recognition and a situation where the adjustment can be intuitively understood are maintained in view of specific properties such as vehicle types and inner wheel difference and outer wheel difference characteristics and an operator's habit in virtual check and the like. On the other hand, for the arrangement with which a different operator who gets in the car can wrongly recognize the visual check position due to a check habit of a particular driver, warning may be provided or arrangement adjustment may be forbidden.

In addition, a configuration in which the vehicle includes execution units of surrounding-obstacle recognition processing and moving-object recognition processing may be employed. Further, there may be employed configurations in which in accordance with inputs from those processing execution units, a warning mark is displayed on the display image, a screen frame indicating an obstacle region or a body region is displayed flashing, and a gradation streaming pattern along a screen frame is displayed for calling for operator's attention, and sound alert is output.

[6. Regarding Configuration Example of Image Processing Apparatus]

Next, a configuration example of the image processing apparatus to be installed in the vehicle will be described with reference to FIG. 26.

Figure 26:
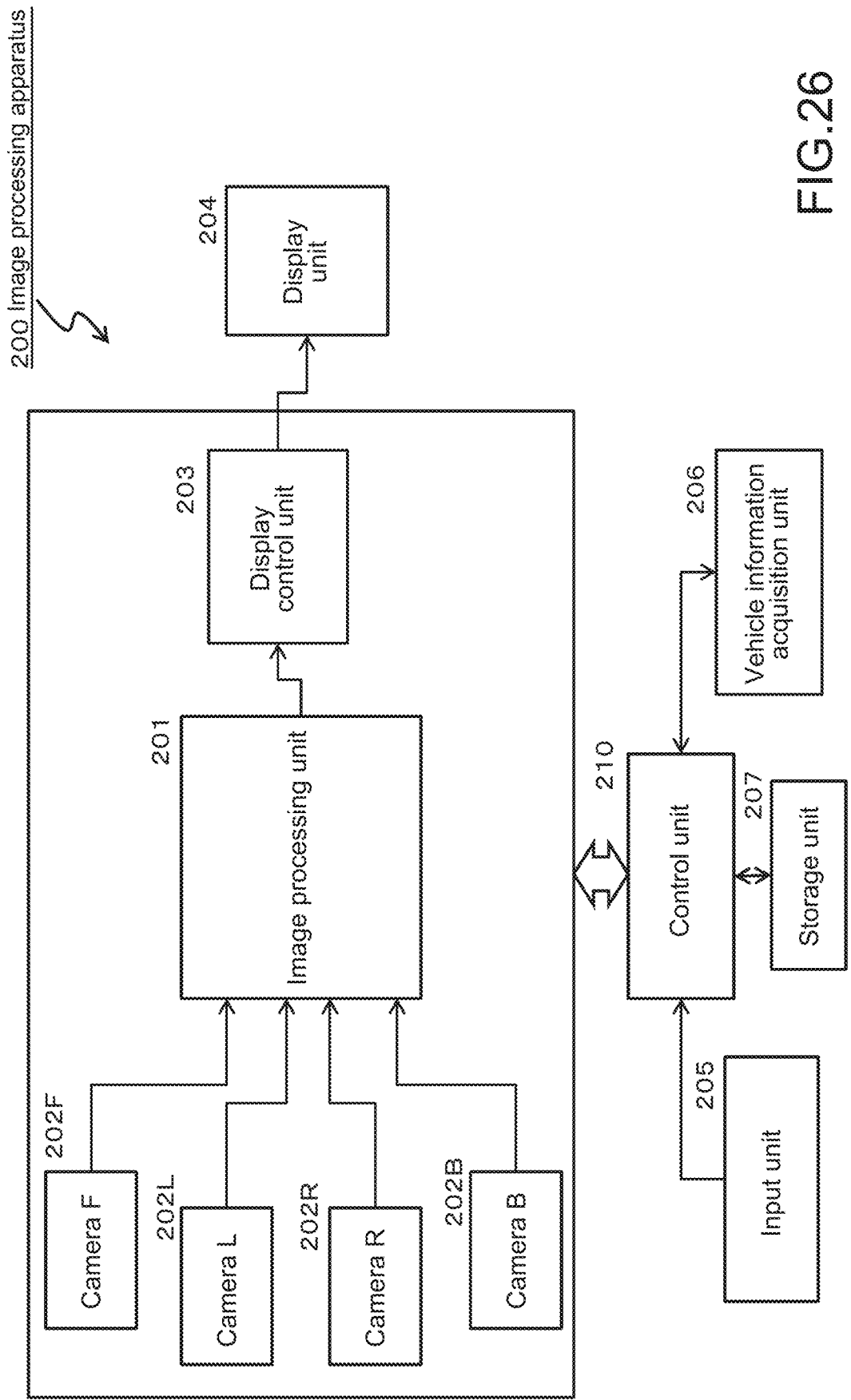
FIG. 26 A diagram describing a configuration example of an image processing apparatus.

FIG. 26 is a diagram showing a configuration example of an image processing apparatus 200 that performs processing according to the above-mentioned embodiment.

As shown in FIG. 26, the image processing apparatus 200 includes an image processing unit 201, a camera F, 202F, a camera L, 202L, a camera R, 202R, a camera B, 202B, a display control unit 203, a display unit 204, an input unit 205, a vehicle information acquisition unit 206, a storage unit 207, and a control unit 210.

The camera F, 202F corresponds to the camera F21 provided in the front surface of the vehicle 10 shown in FIGS. 2A and 2B.

The camera L, 202L corresponds to the camera L22 provided in the left surface of the vehicle 10 shown in FIGS. 2A and 2B.

The camera R, 202R corresponds to the camera R23 provided in the right surface of the vehicle 10 shown in FIGS. 2A and 2B.

The camera B, 202B corresponds to the camera B24 provided in the back surface of the vehicle 10 shown in FIGS. 2A and 2B.

Those cameras are all cameras including a wide-angle lens such as a fisheye lens, for example, and performs shooting of a moving image at a predetermined frame rate and outputs the shot image to the image processing unit 201.

It should be noted that this camera setting example is an example, and a configuration including a dedicated normal camera and a wide-angle camera for photographing the rear of the vehicle and the respective vehicle lateral sides which are the left and the right as described above, for example, may be employed.

Also in the case of including those cameras, images photographed by those cameras are all input into the image processing unit 201.

The image processing unit 201 inputs images photographed by the cameras mounted on the vehicle and generates and outputs images to be displayed on the display unit 204. The images to be generated are the following respective images described with reference to FIG. 10 and other figures, for example:

(a) Overhead image 101;
(b) Travel direction image (rear image) 102B; and
(c) Vehicle lateral side image (left/right side image) 103L/R.

The image processing unit 201 generates four overhead images by performing overhead conversion on the respective images photographed by the camera F, 202F to the camera B, 202B, for example, and further generates an overhead image to be displayed as a composite image in which those four images are combined, the overhead image to be displayed being an image showing a view observed from above the vehicle and having a schematic view of the vehicle which is arranged at the center.

It should be noted that the vehicle lateral side image (left/right side image) 103L/R and the travel direction image (rear image) 102B are generated by the image processing unit 201 performing the image correction processing such as the overhead conversion and the image cutting processing of the images photographed by the camera F, 202F to the camera B, 202B.

An image generated by the image processing unit 201 is displayed on the display unit 204 via the display control unit 203.

The display control unit 203 performs arrangement control and the like of the following respective images to be displayed on, for example, the display unit 204, i.e.,
(a) Overhead image 101,
(b) Travel direction image (rear image) 102B, and
(c) Vehicle lateral side image (left/right side image) 103L/R.

For example, performed is display control processing in which the vehicle lateral side image (left side image) 103L is arranged and displayed in the upper left of the overhead image 101 when displaying the vehicle lateral side image (left side image) 103L, and the vehicle lateral side image (right side image) 103R is arranged and displayed in the upper right of the overhead image 101 when displaying the vehicle lateral side image (right side image) 103R.

The image processing unit 201 further performs processing of generating and drawing a guide line of an arrow or the like indicating the movement direction of the vehicle to be displayed superimposed on the following respective images, processing of updating it, and the like:
(a) Overhead image 101;
(b) Travel direction image (rear image) 102B; and
(c) Vehicle lateral side image (left/right side image) 103L/R.

The vehicle information and other input information are input into the image processing unit 201 or the display control unit 203 via the control unit 210.

The input unit 205 includes, for example, a switch, various keys, a touch panel, and the like for inputting input information of a user, and is capable of performing processing such as movement and enlargement of the display image in accordance with an operation of the touch panel integrated with the display unit 204, for example.

The display control unit 203 performs display control of an image according to information input from the input unit 205. For example, enlargement of the image, reduction in size of the image, change of a display position of the image, and the like are performed. It should be noted that the input unit 205 may be configured as an input unit including an operator's gesture recognition unit. Further, a high-level input system such as head motion and hand gesture recognition, gesture analysis processing using another time-of-flight sensor (TOF sensor), a stereo camera, and an image, and the like may be used.

The vehicle information acquisition unit 206 acquires various types of vehicle information regarding the vehicle such as speed, travel direction, steering wheel setting information, and the like of the vehicle.

Such vehicle information is input into the image processing unit 201 or the display control unit 203 via the control unit 210.

The control unit 210 performs various types of data processing according to a program stored in the storage unit 207, for example.

Specifically, for example, the various types of vehicle information regarding the vehicle such as the speed, the travel direction, the steering wheel setting information, and the like of the vehicle, which is acquired by the vehicle information acquisition unit 206, are input. An image mode of the image to be generated by the image processing unit 201 is determined. Further, the display control unit 202 performs determination processing regarding an image layout mode to be set and the like.

In addition, calculation processing and the like for a line position, the shape, and the like for setting the guide line indicating the movement direction of the car to be drawn in the image generated by the image processing unit 201 are performed.

Such calculation processing is performed in accordance with an arithmetic program stored in the storage unit 207 in advance, for example.

The image processing unit 201 and the display control unit 203 input a result of calculation of the control unit 210 and perform generation and display control of the image in accordance with the input information.

The storage unit 207 stores programs, parameters, and the like regarding data processing to be performed at the control unit 210, the image processing unit 201, the display control unit 203, and the like. In addition, the storage unit 207 is utilized as a work area of each data processing unit. Specifically, the storage unit 207 includes a RAM, a ROM, and the like.

For example, as described above with reference to FIGS. 17, 24, and 25, the image processing unit 201 and the display control unit 203 control configuration and arrangement of a display image to be output to the display unit 204, constitute the display image, and output it to the display unit 204 in a manner that depends on which one of the following states the vehicle state is, i.e., the vehicle is in:

(S01) Forward travel in straight line;
(S02) Rearward travel in straight line (backing in straight line);
(S03) Steering-wheel right-rotation rearward travel (counter-clockwise (left) backing);
(S04) Steering-wheel left-rotation rearward travel (clockwise (right) backing);
(S05) Steering-wheel left-rotation forward travel (counter-clockwise forward travel); and
(S06) Steering-wheel right-rotation forward travel (counter-clockwise forward travel).

For example, in a case where the vehicle is in either (S01) Forward travel in straight line or (S02) Rearward travel in straight line (backing in straight line), only the overhead image and the travel direction image (rear image) are displayed on the display unit as described above.

In such a case, the vehicle does not move in the left and right directions, and even if an obstacle is present on the left or right sides of the vehicle, there is no possibility that the vehicle will hit or crash into the obstacle. Therefore, display processing of the side image and the right side image is not performed.

On the other hand, in a case where the vehicle state is either one of
(S03) Steering-wheel right-rotation rearward travel (counter-clockwise (left) backing), or
(S04) Steering-wheel left-rotation rearward travel (clockwise (right) backing),
the three images, the overhead image, the travel direction image (rear image), and the vehicle lateral side image (front left/right side image), are displayed on the display unit as described above.

In this case, the vehicle front portion moves in the left or right direction.

In a case where the vehicle front portion moves in the left direction, the vehicle lateral side image (front left side image) is displayed in the front left region of the overhead image.

In a case where the vehicle front portion moves in the right direction, the vehicle lateral side image (front right side image) is displayed in the front right region of the overhead image.

By performing such display processing, it becomes possible to suitably present, to the driver who views the display unit 100, a vehicle position to which the driver should pay attention and obstacle information of that position.

It should be noted that the vehicle lateral side image (left/right side image) includes the lateral side image of the vehicle itself and the vehicle movement direction display line indicating the movement direction of the vehicle is further displayed. With those images, the driver can accurately grasp the presence/absence of the obstacle and a distance to the obstacle and can cause the vehicle to safely travel.

On the other hand, in the case where the vehicle state is in either one of
(S05) Steering-wheel left-rotation forward travel (counter-clockwise forward travel), or
(S06) Steering-wheel right-rotation forward travel (counter-clockwise forward travel),
the three images, the overhead image, the travel direction image (front image), and the vehicle lateral side image (rear left/right side image), are displayed on the display unit as described above.

In this case, the vehicle rear portion moves in the left or right direction.

In a case where the vehicle rear portion moves in the left direction, the vehicle lateral side image (rear left side image) is displayed in the rear left region of the overhead image.

In a case where the vehicle rear portion moves in the right direction, the vehicle lateral side image (rear right side image) is displayed in the rear right region of the overhead image.

By such display processing, it becomes possible to suitably present, to the driver who views the display unit 100, a vehicle position to which the driver should pay attention and obstacle information of that position.

It should be noted that the vehicle lateral side image (rear left/right side image) includes the lateral side image of the vehicle itself and the vehicle movement direction display line indicating the movement direction of the vehicle is further displayed. With those images, the driver can accurately grasp the presence/absence of the obstacle and a distance to the obstacle and can cause the vehicle to safely travel.

In this manner, the image processing apparatus of the present disclosure inputs an image photographed by a camera that photographs the surroundings of the vehicle, generates an overhead image, a vehicle travel direction image, and a vehicle lateral side image corresponding to a vehicle movement direction which is either left or right of the vehicle on the basis of the input image, and displays the generated image on a display unit. For example, a display image is generated or updated in accordance with a travel direction of the vehicle and direction-of-rotation information of a steering wheel. In a case where the vehicle is backed counter-clockwise, the overhead image, the vehicle rear image, and a vehicle left side image are generated and displayed. In a case where the vehicle is backed clockwise, the overhead image, the vehicle rear image, and a vehicle right side image are generated and displayed.

With such image display processing, the image display with the improved visibility of the information regarding the surroundings of the vehicle is achieved.

[7. Conclusion of Configuration of Present Disclosure]

The embodiment of the present disclosure has been described in detail with reference to the specific embodiment. However, it is obvious that those skilled in the art can make modifications and replacements of the embodiment without departing from the gist of the present disclosure. That is, the present disclosure is described herein for illustrative purposes only and should not be exclusively understood. In order to determine the gist of the present disclosure, appended claims should be taken into consideration.

It should be noted that the technology disclosed in this specification can take the following configurations.

(1) An image processing apparatus, including
an image processing unit that generates a display image for a display unit, which is visually recognizable by a vehicle operator, in which
the image processing unit
receives an image photographed by a camera that photographs surroundings of a vehicle,
generates, on the basis of the received photographed image,
a vehicle travel direction image, and
a vehicle lateral side image corresponding to a vehicle movement direction which is either left or right of the vehicle, and
outputs the generated vehicle travel direction image and the generated vehicle lateral side image to the display unit.

(2) The image processing apparatus according to (1), in which
the image processing unit
further generates, on the basis of the image photographed by the camera, an overhead image which is a virtual image showing a view observed from above the vehicle or obliquely from above the vehicle, and
causes the display unit to display the generated overhead image along with the vehicle travel direction image and the vehicle lateral side image at the same time.

(3) The image processing apparatus according to (1) or (2), in which
the image processing unit
receives vehicle information including information regarding at least either a travel direction of the vehicle or a direction of rotation of a steering wheel and generates or updates a display image in accordance with the received vehicle information.

(4) The image processing apparatus according to (3), in which
the image processing unit
receives direction-of-rotation information of the steering wheel as the vehicle information and generates or updates a display image in accordance with the received direction-of-rotation information of the steering wheel.

(5) The image processing apparatus according to (4), in which
the image processing unit
causes, in a manner that depends on whether the direction-of-rotation information of the steering wheel indicates a right rotation or a left rotation, a vehicle left side image or a vehicle right side image to be selectively displayed as the vehicle lateral side image.

(6) The image processing apparatus according to (5), in which
the image processing unit
receives, as the vehicle information, the travel direction information of the vehicle and the direction-of-rotation information of the steering wheel, and
if it is determined that the vehicle travels backward and counter-clockwise on the basis of the travel direction information of the vehicle and the direction-of-rotation information of the steering wheel,
generates a vehicle rear image as the vehicle travel direction image,
generates the vehicle left side image as the vehicle lateral side image, and
causes the display unit to display the generated vehicle rear image and the generated vehicle left side image.

(7) The image processing apparatus according to (6), in which
the image processing unit
further generates, on the basis of the image photographed by the camera, an overhead image which is a virtual image showing a view observed from above the vehicle, and
causes the display unit to display the vehicle left side image while the vehicle left side image is arranged on a left side of the overhead image and on a side opposite to the travel direction of the vehicle.

(8) The image processing apparatus according to (5), in which
the image processing unit
receives, as the vehicle information, the travel direction information of the vehicle and the direction-of-rotation information of the steering wheel, and
if it is determined that the vehicle travels backward and clockwise on the basis of the travel direction information of the vehicle and the direction-of-rotation information of the steering wheel,
generates a vehicle rear image as the vehicle travel direction image,
generates the vehicle right side image as the vehicle lateral side image, and
causes the display unit to display the generated vehicle rear image and the generated vehicle right side image.

(9) The image processing apparatus according to (8), in which
the image processing unit
further generates, on the basis of the image photographed by the camera, an overhead image which is a virtual image showing a view observed from above the vehicle, and
causes the display unit to display the vehicle right side image while the vehicle right side image is arranged on a right side of the overhead image and on a side opposite to the travel direction of the vehicle.

(10) The image processing apparatus according to any of (1) to (9), in which
the image processing unit
generates the vehicle lateral side image such that a side region image of the vehicle itself is included in the vehicle lateral side image.

(11) The image processing apparatus according to any of (1) to (10), in which
the image processing unit
generates the vehicle lateral side image in which at least any one of a guide line indicating the movement direction of the vehicle, a guide line indicating a sweeping space of an outermost portion of a vehicle body in a road space, or a steering wheel track guide line is superimposed on a generated image based on the image photographed by the camera.

(12) The image processing apparatus according to (2), in which
the image processing unit
superimposes an indication for warning of a hit risk on at least any one of the vehicle travel direction image, the vehicle lateral side image, or the overhead image.

(13) The image processing apparatus according to any of (1) to (12), in which
the vehicle travel direction image includes an end portion region image of the vehicle itself.

(14) The image processing apparatus according to any of (1) to (13), in which
the image processing unit
further generates, on the basis of the image photographed by the camera, an overhead image which is a virtual image showing a view observed from above the vehicle or obliquely from above the vehicle, and
causes the display unit to display the vehicle lateral side image while the vehicle lateral side image is superimposed on the generated overhead image.

(15) An image processing method to be executed in an image processing apparatus including an image processing unit that generates a display image for a display unit, which is visually recognizable by a vehicle operator, the image processing method including:
by the image processing unit,
receiving an image photographed by a camera that photographs surroundings of a vehicle;
generating, on the basis of the received photographed image, a vehicle travel direction image and a vehicle lateral side image corresponding to a vehicle movement direction which is either left or right of the vehicle; and outputting the generated vehicle travel direction image and the generated vehicle lateral side image to the display unit.

(16) A program that causes image processing to be executed in an image processing apparatus including an image processing unit that generates a display image for a display unit, which is visually recognizable by a vehicle operator, the program causing the image processing unit to execute:

processing of receiving an image photographed by a camera that photographs surroundings of a vehicle;

processing of generating, on the basis of the received photographed image, a vehicle travel direction image and a vehicle lateral side image corresponding to a vehicle movement direction which is either left or right of the vehicle; and processing of outputting the generated vehicle travel direction image and the generated vehicle lateral side image to the display unit.

Further, the series of processing described herein can be executed by hardware, software, or a combined configuration of both. When the processing is executed by software, the program with a processing sequence recorded therein can be installed in a memory within a computer embedded in dedicated hardware and executed, or a program can be installed in a general-purpose computer which can execute various types of processing and executed. The program can be recorded in advance in a recording medium, for example. The program can not only be installed from the recording medium to the computer but can also be received via a network such as a local area network (LAN) or the Internet and installed in a recording medium such as a built-in hard disk.

It should be noted that the various types of processing described herein may be executed in a time series in an order of the description or may be executed in parallel or individual manner in a manner that depends on a processing capability of a device which executes the processing or in a manner that depends on needs. Further, the term "system" set forth herein is a logical complex configuration of a plurality of apparatuses, and apparatuses with respective configurations are not necessarily provided in the same housing.

INDUSTRIAL APPLICABILITY

As described above, in accordance with the configuration of the embodiment of the present disclosure, an image processing apparatus that achieves image display with improved visibility of information regarding the surroundings of a vehicle is realized.

Specifically, for example, an image photographed by a camera that photographs the surroundings of the vehicle is input. An overhead image, a vehicle travel direction image, and a vehicle lateral side image corresponding to a vehicle movement direction which is either left or right of the vehicle is generated on the basis of the input image. The generated image is displayed on a display unit. For example, a display image is generated or updated in accordance with a travel direction of the vehicle and direction-of-rotation information of a steering wheel. In a case where the vehicle is backed counter-clockwise, the overhead image, the vehicle rear image, and a vehicle left side image are generated and displayed. In a case where the vehicle is backed clockwise, the overhead image, the vehicle rear image, and a vehicle right side image are generated and displayed.

With this configuration, the image processing apparatus that achieves the image display with the improved visibility of the information regarding the surroundings of the vehicle is realized.

REFERENCE SIGNS LIST 1 display unit
2 overhead image
3 travel direction image
10 vehicle
21 to 24 camera
30 wide-angle camera
31 object to be photographed
41 vehicle
42 obstacle
42a obstacle image
101 overhead image
102 travel direction image
103 vehicle lateral side image
111a obstacle image
112 vehicle movement direction display line
113 vehicle lateral side image
114 vehicle bumper image
201 image processing unit
202 camera
203 display control unit
204 display unit
205 input unit
206 vehicle information acquisition unit
207 storage unit
210 control unit

The invention claimed is:

1. An image processing apparatus, comprising:
a processor configured to:
receive an image of surroundings of a vehicle from at least one camera;
receive vehicle information including a direction of rotation of a steering wheel of the vehicle and travel direction information of the vehicle;
generate, based on the received image, a vehicle travel direction image, a vehicle lateral side image, an overhead image, and an object image of an obstacle, wherein
the vehicle lateral side image corresponds to a vehicle movement direction to one of a left side or a right side of the vehicle, and
the overhead image is a virtual viewpoint image that shows a view observed from above the vehicle;
generate a virtual lateral side image configured to display a sweeping space graphic extending between an outermost portion of a vehicle body in the vehicle lateral side image and the obstacle in the object image, wherein
the outermost portion of the vehicle body is a right side vehicle front portion when the vehicle is backed in a clockwise direction,
the outermost portion of the vehicle body is a left side vehicle front portion when the vehicle is backed in an anticlockwise direction, and
the virtual lateral side image is generated in a case where the vehicle lateral side image indicates a possibility of a collision between the obstacle and one of the right side vehicle front portion or the left side vehicle front portion;
generate an obstacle partial region graphic in a case where the vehicle lateral side image indicates the possibility of the collision between a specific region of the obstacle and one of the right side vehicle front portion or the left side vehicle front portion;

superimpose the generated obstacle partial region graphic on the object image at the specific region of the obstacle in the object image; and control a display device to concurrently display the overhead image, the vehicle travel direction image, and the vehicle lateral side image, wherein the vehicle lateral side image includes:

the object image having the generated obstacle partial region graphic superimposed on the object image; and the virtual lateral side image including the sweeping space graphic.

2. The image processing apparatus according to claim 1, wherein the processor is further configured to one of generate or update the overhead image, the vehicle travel direction image, and the vehicle lateral side image based on the received vehicle information.

3. The image processing apparatus according to claim 1, wherein the processor is further configured to one of generate or update the overhead image, the vehicle travel direction image, and the vehicle lateral side image based on the direction of rotation of the steering wheel.

4. The image processing apparatus according to claim 1, wherein the processor is further configured to selectively display one of a vehicle left side image or a vehicle right side image as the vehicle lateral side image based on the direction of rotation of the steering wheel.

5. The image processing apparatus according to claim 4, wherein the processor is further configured to:

determine that the vehicle travels backward and in the anti-clockwise direction based on the travel direction information of the vehicle and the direction of rotation of the steering wheel;

generate a vehicle rear image as the vehicle travel direction image based on the determination;

generate the vehicle left side image as the vehicle lateral side image based on the determination; and control the display device to display the generated vehicle rear image and the generated vehicle left side image.

6. The image processing apparatus according to claim 5, wherein the processor is further configured to display the vehicle left side image on a left side of the overhead image.

7. The image processing apparatus according to claim 4, wherein the processor is further configured to:

determine that the vehicle travels backward and in the clockwise direction based on the travel direction information of the vehicle and the direction of rotation of the steering wheel;

generate a vehicle rear image as the vehicle travel direction image based on the determination;

generate the vehicle right side image as the vehicle lateral side image based on the determination; and control the display device to display the generated vehicle rear image and the generated vehicle right side image.

8. The image processing apparatus according to claim 7, wherein the processor is further configured to display the vehicle right side image on a right side of the overhead image.

9. The image processing apparatus according to claim 1, wherein the processor is further configured to generate the vehicle lateral side image such that a side region image of the vehicle is included in the vehicle lateral side image.

10. The image processing apparatus according to claim 1, wherein the processor is further configured to generate the vehicle lateral side image such that a guide line that indicates the vehicle movement direction of the vehicle superimposed on the generated vehicle lateral side image.

11. The image processing apparatus according to claim 1, wherein the processor is further configured to superimpose an indication to warn of a hit risk on at least one of the vehicle travel direction image, the vehicle lateral side image, or the overhead image.

12. The image processing apparatus according to claim 1, wherein the vehicle travel direction image further includes an end portion region image of the vehicle.

13. The image processing apparatus according to claim 1, wherein the vehicle lateral side image includes one of a front right side image, a rear right side image, a front left side image, or a rear left side image of the vehicle, and the processor is further configured to superimpose the front right side image on a front right region of the overhead image, the rear right side image on a rear right region of the overhead image, the front left side image on a front left region of the overhead image, or the rear left side image on a rear left region of the overhead image.

14. The image processing apparatus according to claim 1, wherein the processor is further configured to:

receive a speed of the vehicle or a time elapsed from a start of a departure of the vehicle as the vehicle information; and control the display device to display a horizontally-rearward and downward image of rear wheels of the vehicle in a case where one of the speed of the vehicle is below a determined speed or the time elapsed from the start of the departure of the vehicle is less than a determined time.

15. The image processing apparatus according to claim 14, wherein the processor is further configured to control the display device to display the vehicle lateral side image that corresponds to a camera monitoring system mode image in a case where one of the speed of the vehicle is above the determined speed or the time elapsed from the start of the departure is more than the determined time.

16. The image processing apparatus according to claim 1, wherein the processor is further configured to change one of a size or a display position of at least one of the vehicle travel direction image, the vehicle lateral side image, or the overhead image based on a user input.

17. An image processing method, comprising:

in a processor:

receiving an image of surroundings of a vehicle from at least one camera;

receiving vehicle information including a direction of rotation of a steering wheel of the vehicle and travel direction information of the vehicle;

generating, based on the received image, a vehicle travel direction image, a vehicle lateral side image, an overhead image, and an object image of an obstacle, wherein the vehicle lateral side image corresponds to a vehicle movement direction to one of a left side or a right side of the vehicle, and the overhead image is a virtual viewpoint image that shows a view observed from above the vehicle;

generating a virtual lateral side image configured to display a sweeping space graphic extending between an outermost portion of a vehicle body and the obstacle in the object image, wherein the outermost portion of the vehicle body is a right side vehicle front portion when the vehicle is backed in a clockwise direction, the outermost portion of the vehicle body is a left side vehicle front portion when the vehicle is backed in an anticlockwise direction, and the virtual lateral side image is generated in a case where the vehicle lateral side image indicates a possibility of a collision between the obstacle and one of the right side vehicle front portion or the left side vehicle front portion;

generating an obstacle partial region graphic in a case where the vehicle lateral side image indicates the possibility of the collision between a specific region of the obstacle and one of the right side vehicle front portion or the left side vehicle front portion;

superimposing the generated obstacle partial region graphic on the object image at the specific region of the obstacle in the object image; and controlling the display device to concurrently display the overhead image, the vehicle travel direction image, and the vehicle lateral side image, wherein the vehicle lateral side image includes:

the object image having the generated obstacle partial region graphic superimposed on the object image; and the virtual lateral side image including the sweeping space graphic.

18. A non-transitory computer-readable medium having stored thereon, computer-executable instructions which, when executed by a processor, cause the processor to execute operations, the operations comprising:

receiving an image of surroundings of a vehicle from at least one camera;

receiving vehicle information including a direction of rotation of a steering wheel of the vehicle and travel direction information of the vehicle;

generating, based on the received image, a vehicle travel direction image, a vehicle lateral side image, an overhead image, and an object image of an obstacle, wherein the vehicle lateral side image corresponds to a vehicle movement direction to one of a left side or a right side of the vehicle, and the overhead image is a virtual viewpoint image that shows a view observed from above the vehicle;

generating a virtual lateral side image configured to display a sweeping space graphic extending between an outermost portion of a vehicle body and the obstacle in the object image, wherein the outermost portion of the vehicle body is a right side vehicle front portion when the vehicle is backed in a clockwise direction, the outermost portion of the vehicle body is a left side vehicle front portion when the vehicle is backed in an anticlockwise direction, and the virtual lateral side image is generated in a case where the vehicle lateral side image indicates a possibility of a collision between the obstacle and a vehicle front portion;

generating an obstacle partial region graphic in a case where the vehicle lateral side image indicates the possibility of the collision between a specific region of the obstacle and the vehicle front portion;

superimposing the generated obstacle partial region graphic on the object image at the specific region of the obstacle in the object image; and controlling the display device to concurrently display the overhead image, the vehicle travel direction image, and the vehicle lateral side image, wherein the vehicle lateral side image includes:

the object image having the generated obstacle partial region graphic superimposed on the object image; and the virtual lateral side image including the sweeping space graphic.

19. An image processing system, comprising:

at least one camera configured to capture an image; and a processor configured to:

receive the image of surroundings of a vehicle from the at least one camera;

receive vehicle information including a direction of rotation of a steering wheel of the vehicle and travel direction information of the vehicle;

generate, based on the received image, a vehicle travel direction image, a vehicle lateral side image, an overhead image, and an object image of an obstacle, wherein the vehicle lateral side image corresponds to a vehicle movement direction to one of a left side or a right side of the vehicle, and the overhead image is a virtual viewpoint image that shows a view observed from above the vehicle;

generate a virtual lateral side image configured to display a sweeping space graphic extending between an outermost portion of a vehicle body and the obstacle in the object image, wherein the outermost portion of the vehicle body is a right side vehicle front portion when the vehicle is backed in a clockwise direction, the outermost portion of the vehicle body is a left side vehicle front portion when the vehicle is backed in an anticlockwise direction, and the virtual lateral side image is generated in a case where the vehicle lateral side image indicates a possibility of a collision between the obstacle and one of the right side vehicle front portion or the left side vehicle portion;

generate an obstacle partial region graphic in a case where the vehicle lateral side image indicates the possibility of the collision between a specific region of the obstacle and one the right side vehicle front portion or the left side vehicle front portion;

superimpose the generated obstacle partial region graphic on the object image at the specific region of the obstacle in the object image; and control a display device to concurrently display the overhead image, the vehicle travel direction image, and the vehicle lateral side image, wherein the vehicle lateral side image includes:

the object image having the generated obstacle partial region graphic superimposed on the object image; and the virtual lateral side image including the sweeping space graphic.

* * * * *